(12) United States Patent
Malladi et al.

(10) Patent No.: US 8,285,216 B2
(45) Date of Patent: Oct. 9, 2012

(54) INTER-CELL POWER CONTROL FOR INTERFERENCE MANAGEMENT

(75) Inventors: Durga Prasad Malladi, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 428 days.

(21) Appl. No.: 12/443,969

(22) PCT Filed: Oct. 31, 2007

(86) PCT No.: PCT/US2007/083260
§ 371 (c)(1),
(2), (4) Date: Jun. 30, 2009

(87) PCT Pub. No.: WO2008/055247
PCT Pub. Date: May 8, 2008

(65) Prior Publication Data
US 2010/0029212 A1   Feb. 4, 2010

Related U.S. Application Data

(60) Provisional application No. 60/863,928, filed on Nov. 1, 2006.

(51) Int. Cl.
*H04B 1/00* (2006.01)
*H04B 15/00* (2006.01)

(52) U.S. Cl. ......... 455/63.1; 455/69; 455/522; 375/130; 375/260

(58) Field of Classification Search .................. 455/63.1, 455/69, 522; 375/130, 260, 295
See application file for complete search history.

(56) References Cited

U.S. PATENT DOCUMENTS

| | | | |
|---|---|---|---|
| 6,600,772 B1 * | 7/2003 | Zeira et al. ..................... | 375/130 |
| 2002/0077138 A1 | 6/2002 | Bark et al. | |
| 2002/0168994 A1 | 11/2002 | Terry et al. | |
| 2006/0152285 A1 * | 7/2006 | Gustavsson et al. .......... | 330/278 |

FOREIGN PATENT DOCUMENTS

| | | |
|---|---|---|
| EP | 0999657 | 5/2000 |
| EP | 1617691 A1 | 1/2006 |
| JP | 10065604 A | 3/1998 |

(Continued)

OTHER PUBLICATIONS

Qualcomm Europe:"TP on interference management for OFDM based E-UTRA downlink evaluation", R1-051130, Oct. 10, 2005-Oct. 14, 2005, San Diego, retrieved from the Internet, URL: ftp://ftp.3gpp.org/tsg_ran/WG1_RL1/TSGR1_42bis/Docs/R1-051130.zip> downloaded on Apr. 29, 2010 whole document. Qualcomm Europe:"TP on interference management for OFDM based E-UTRA downlink evaluation", R1-051494, Nov. 7, 2005-Nov. 11, 2005, Seoul, retrieved from the Internet, URL: ftp://ftp.3gpp.org/tsg_ran/WG1_RL1/TSGR1_43/Docs/R1-0511494 .zip> downloaded on Apr. 29, 2010 whole document.
International Search Report and Written Opinion—PCT/US07/083260, International Search Authority—European Patent Office—Feb. 15, 2008.
Qualcomm Europe,"Analysis of Inter-cell Power Control for Interference Management in E-UTRA UL",3GPP TSG-RAN WG1 #46bis R1-06-2705,3GPP,Oct. 9, 2006,R1-06-2705,p. 1-17.
Qualcomm Europe,"System Analysis for UL SIMO SC-FDMA",3GPP TSG-RAN WG1 LTE 45, May 8-12, 2006, R1-061525, p. 1-12.
Taiwan Search Report—TW096141263—TIPO—Mar. 25, 2012.

*Primary Examiner* — Tuan H Nguyen
(74) *Attorney, Agent, or Firm* — Liem T. Do

(57) ABSTRACT

A system and method for inter-cell power control for interference management in an OFDM system is provided. The system provides for a combination use of open loop and closed loop PSD control algorithms. The open loop control is a function of path loss from the serving cell as well as the neighboring cells. The closed loop control updates the end node transmit PSD by listening to the load indicators from the serving cell and at least one other neighboring non-serving cell which generates the highest level of interference. The system thus provides a fast and tight control with multi-cell information that allows improved inter-cell interference control.

34 Claims, 22 Drawing Sheets

FOREIGN PATENT DOCUMENTS

| | | |
|---|---|---|
| JP | 2002077041 A | 3/2002 |
| JP | 2002539707 | 11/2002 |
| JP | 2004208234 A | 7/2004 |
| JP | 2005252548 A | 9/2005 |
| RU | 2233037 | 7/2004 |
| RU | 2335851 | 10/2008 |
| WO | WO2004114704 | 12/2004 |
| WO | 2006007318 | 1/2006 |
| WO | WO2006019287 A1 | 2/2006 |
| WO | WO2006099546 A1 | 9/2006 |

* cited by examiner

INTER-CELL POWER CONTROL FOR INTERFERENCE MANAGEMENT

CROSS-REFERENCE TO RELATED APPLICATIONS

This application claims the benefit of U.S. Provisional Patent application Ser. No. 60/863,928 entitled "Method And Apparatus For Inter-Cell Power Control For Interference Management" which was filed Nov. 1, 2006. The entirety of the aforementioned application is herein incorporated by reference.

BACKGROUND

I. Field

The following description relates generally to wireless communications, and more particularly to inter-cell power control for interference management in an OFDM system.

II. Background

Typical load control scenarios focus either on closed loop or open loop controls. There are limited views on incorporating both types of loop control. In non-orthogonal systems, methods involving both type of loop control are geared to spread spectrum time division systems and are aimed at single cell applications. In orthogonal systems, there are two main schools of thought as to uplink interference control. One camp favors a closed loop PSD control while the other favors an open loop PSD control. Each method has its advantages and disadvantages.

Typically, closed loop power control methodologies are very fast and there is a perception that there is little need for an open loop control method. However, there are concerns with accuracy of closed loop control and that without a proper starting point, the closed loop approach may not be fast enough.

In a representative open loop power control method, the end node uses the measured total received power along with typical values of certain base station parameters to get a rough estimate of the transmission loss between the end node and the base station. Based on these measurements, the forward link transmission loss is estimated and used to determine the proper open loop power control setting for the end node transmitter. The end node's transmit power is adjusted to match the estimated path loss, to arrive at the base station at a predetermined level. All end nodes within a cell use the same process, and ideally their signal will arrive with equal power at the base station.

The base station parameters typically contain correction factor(s) to be used by the end nodes in its open loop power estimate on an ongoing as well as for the initial transmission on an access channel. Conventional algorithms exist for estimating the end node's desired transmit power for the first access probe on the access channel. It should be noted that the value of the open loop power control constant depends on many dynamically varying parameters (including for example cell layout, network load, location of end node within the cell.) None of these dynamically changing variables is known, a priori, hence, the first probe power level will likely be in error. The error may result in a far too high of a power level than necessary to establish communications when the mobile station is close to the base station. When the transmit power level is too high, unnecessary interference to the remaining mobile stations is created, reducing the capacity of the system. On the other hand, if the mobile station is far away, it may transmit the initial access probe at too low a power level, resulting in additional probes being sent. In addition to increasing call setup time, additional probes will result in more reverse link interference.

Urban Canyon areas are also in need of improved control, where the geometry of the cell coverage may impose dynamic and unreliable load indications on the end node's traveling in the area. Turning a corner and blasting the heightened cell phone transmit power into a neighboring cell needs a better control mechanism as controlling by a single serving cell is not adequate.

Therefore, in order to maximize the effectiveness of user experience, it may be appreciated from the foregoing discussion that the problems with interference from other cells and weak signals from the serving cell at a cell's edge should be considered in more detail for desired control methodology than the current state of the art provides.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

In orthogonal systems, inter-cell interference often drives inefficiency of a multi-cell system. An aspect of the claimed subject matter provides for a control method that listens to more than one cell's load commands. This allows an end node to overcome a typical limitation of a serving cell not being aware of interference caused by transmission of its terminals to other cells.

In an aspect, with an orthogonal uplink, inter-cell interference dictates coverage in a cell. The coverage needs to be evaluated for both uplink Control, which does not benefit from HARQ nor from link adaptation, and uplink Data, which benefits from HARQ and might or might not benefit from link adaptation depending on the UE speed. In most system level analysis done during the SI phase, the simulations do not consider the coverage of control channels. The 5% user data throughput is not the adequate metric to dictate the true coverage of the system due to the benefit from HARQ and link adaptation on the UL shared data channel. For efficient functioning of the uplink, the inter-cell interference needs to be tightly controlled by the network regardless of the uplink load.

With an orthogonal uplink, in a single cell scenario, a UE may transmit at maximum Tx power without impacting the link performance of other users. In a multi-cell scenario, with such a strategy, UEs at cell edge inject significant interference into other cells, diminishing the system coverage. However, cell interior UEs typically do not cause interference in other cells. For a stable and optimal system operation, we observe that cell interior UEs may transmit at higher power or power spectral density, than the UEs at cell edges. Therefore, we keep two objectives in mind for an UL interference management algorithm: 1) means to reduce inter-cell interference and 2) scheduler flexibility to allocate bandwidth to different users. Further, conventional assumptions may include that each UE has a single serving cell in the uplink and that the serving cell is typically not aware of the interference caused by the transmission from its terminals to the other cells.

From a high level perspective, the proposed closed loop PSD control entails that each cell broadcasts an uplink load indicator (busy or not) in the downlink in a periodic manner.

That each UE decodes the load indicator bits from at least one dominant interfering cell (based on path loss measurements) and that the UE appropriately reduces its allowed Tx power spectral density. In more detail, a reference PSD (e.g. PSD based on a periodic known signal such as CQI) is maintained at the Node-B and used for intra cell power control. The UE periodically reports a PSD delta and a supportable bandwidth. The reference PSD delta is a function of load indication commands from non-serving cells and indicates the power headroom available at the UE assuming that the assigned (granted) bandwidth for data transmission equals the CQI bandwidth. The supportable bandwidth is computed from the maximum transmit power and the Tx PSD and indicates the maximum bandwidth that may be supported by the UE, given the max Tx power constraint and the PSD at which UE transmits data. The Node-B grants an uplink assignment consisting of bandwidth (e.g. number of tones) and packet format (e.g. packet size and modulation). It is to be appreciated that assignment bandwidth should be lower than the supportable bandwidth. UE transmits the packet in accordance with the assignment with the PSD delta.

Another aspect provides for permitting scheduler flexibility in reducing inter-cell interference. A scheduler for each cell has flexibility to allocate variable bandwidth and power spectral density (PSD) to end nodes in its domain. The scheduler can allow higher transmit power usage for end node's in cell centers where that greater power usage does not cause interference with other cells.

Another aspect provides for a method of using both open and closed loop controls. By first employing an open loop PSD control at the beginning use of end node accuracy concerns of the closed loop process are alleviated. Once an initial target value is established, control is switched to the closed loop method, and errors and uncertainties associated with the open loop process are mitigated.

In another aspect, when an end node experiences a sharp change in path loss value, reestablishing the target for closed loop control becomes analogous to a state of beginning use, and the method captures benefits of both open and closed loop systems.

An aspect provides for a method that facilitates inter-cell interference control in an OFDM system, comprising: using a target Rxed which utilizes path loss readings from both end node to serving node and from end node to neighboring non-serving nodes; using open loop PSD control at the onset of end node use or at a large change in end node path loss function; and switching to closed loop PSD control at an appropriate time.

Another aspect provides for a computer readable medium having stored thereon computer executable instructions for performing the following acts: using a target Rxed which utilizes path loss readings from both end node to serving node and from end node to neighboring non-serving nodes; using open loop PSD control at the onset of end node use or at a large change in end node path loss function; and switching to closed loop PSD control at an appropriate time.

Another aspect provide for a processor that executes code to control inter-cell interference an OFDM system, and executes computer executable code stored on a storage medium to use a target Rxed which utilizes path loss readings from both end node to serving node and from end node to neighboring non-serving nodes; use open loop PSD control at the onset of end node use or at a large change in end node path loss function; and switch to closed loop PSD control at an appropriate time.

Yet another aspect provides for a system that that facilitates inter-cell interference control in an OFDM system, comprising means for using a target Rxed which utilizes path loss readings from both end node to serving node and from end node to neighboring non-serving nodes; means for using open loop PSD control at the onset of end node use or at a large change in end node path loss function; and means for switching to closed loop PSD control at an appropriate time.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
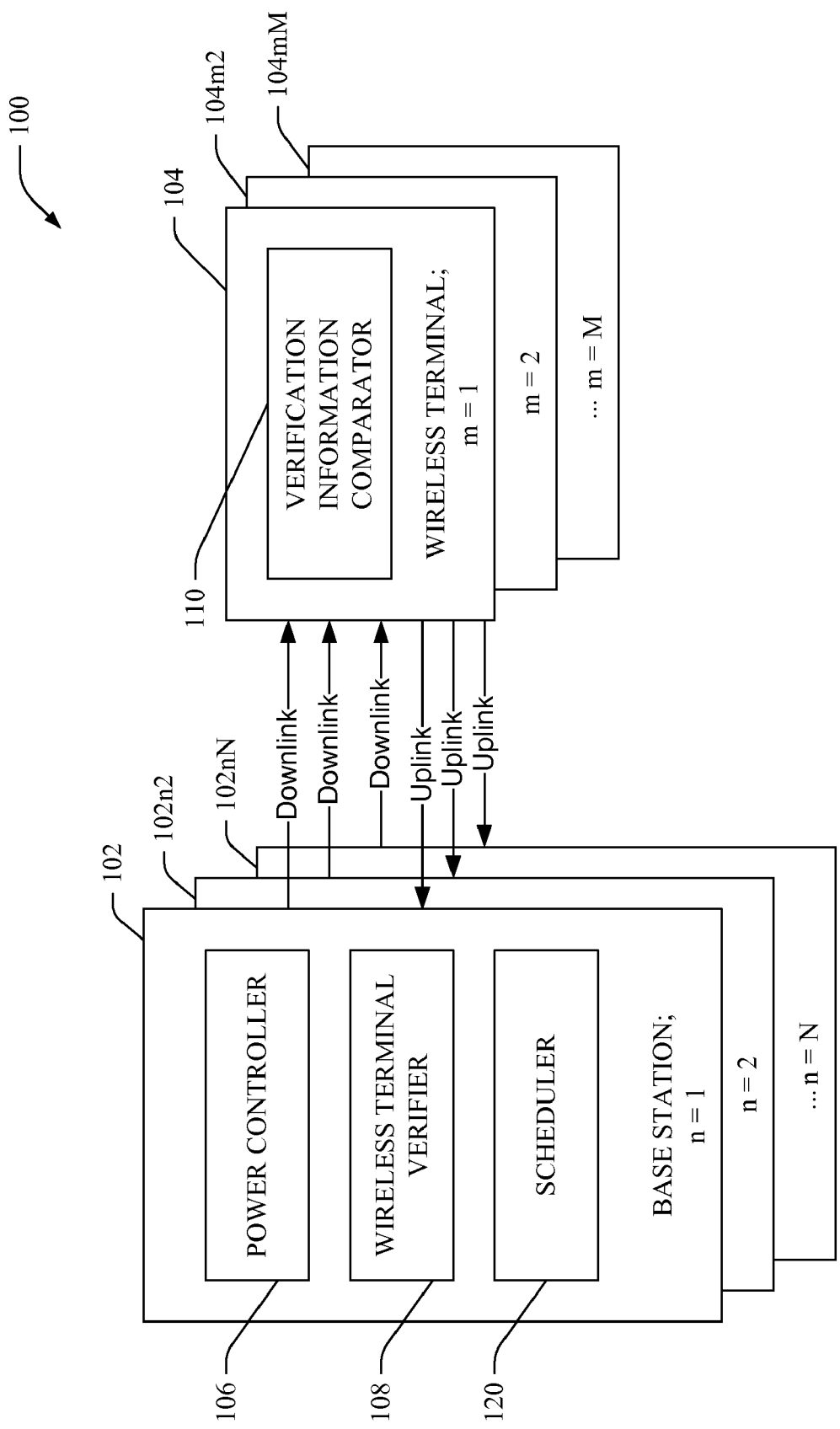
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

Furthermore, various embodiments are described herein in connection with a wireless terminal. A wireless terminal may refer to a device providing voice and/or data connectivity to a user. A wireless terminal may be connected to a computing device such as a laptop computer or desktop computer, or it may be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment. A wireless terminal may be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem.

A base station (e.g., access point) may refer to a device in an access network that communicates over the air-interface, through one or more sectors, with wireless terminals. The base station may act as a router between the wireless terminal and the rest of the access network, which may include an IP network, by converting received air-interface frames to IP packets. The base station also coordinates management of attributes for the air interface.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. The system 100 provides for hybrid closed and open-loop control. The system 100 includes base stations 102 (N number of base stations—N being an integer), wireless terminals (or user equipment (UE)) 104 (M number of wireless terminals—M being an integer), respective power controllers 106, respective wireless terminal verifiers 108, respective verification comparators 110, and a scheduler 120.

In orthogonal systems, inter-cell interference often drives inefficiency of a multi-cell system. Path-loss in connection with neighboring cells is evaluated to facilitate mitigating the inter-cell interference. The system employs both open-loop and closed-loop controls with a load indicator to mitigate the inter-cell interference. In particular, and provides for the wireless terminal 104 a control method that listens to more than one cell's load commands. The load commands from the neighboring cells can be conveyed via the air interface, or they can be conveyed by the serving cell through the inter eNode-B communications via the backhaul. This allows an end node to overcome a typical limitation of a serving cell not being aware of interference caused by transmission of its terminals to other cells.

Initially, when wireless terminal 104 starts it is controlled by base station 102 via an open-loop control function to establish target power and receiver interference levels. Moreover, when the UE enters a network or it suddenly experiences a drastic change in path loss, its transmit PSD is adjusted by an open-loop algorithm to allocate for a fast update based on download (DL) path loss. The open-loop algorithm controls interference level to some extent in the sense that target received signal to noise ratio (SNR) can be made a function of the path loss to a serving cell, and neighboring non-serving cells. As the open-loop algorithm typically does not have tight control on interference injected into another cell, the UE 104 later updates its transmit PSD by listening to load indicators from neighboring non-serving cells. The load commands from the neighboring cells can be conveyed via the air interface, or they can be conveyed by the serving cell through the inter eNode-B communications via the backhaul. When the load commands are conveyed via the air interface, DOWN load commands are sent to the UE from its neighboring non-serving cells when they experience a higher interference level compared to a target—otherwise UP commands are transmitted. The UE 104 lowers its transmit PSD once it receives the DOWN commands; otherwise, it increases its transmit PSD. When the load commands are conveyed through the inter eNode-B communications via the backhaul, serving cell adjusts the Tx PSD of the UE accordingly based on the received load commands from the neighboring cells. The adjustment can be subsumed in the scheduling commands or it can be done by serving cell sending down the load commands to the UE. It is to be appreciated that the PSD adjustment corresponding to load commands may not be as drastic as that corresponding to open-loop control. As load indicators indicate interference level seen by other cells, tight interference control can be achieved, and thus fast and tight interference control can be obtained.

Scheduler 120 provides for permitting scheduler flexibility in reducing inter-cell interference—the scheduler 120 for each cell has flexibility to allocate variable bandwidth and power spectral density (PSD) to end nodes in its domain. The scheduler 120 can allow higher transmit power usage for end node's in cell centers where that greater power usage does not cause interference with other cells.

System 100 can comprise a base station 102 that receives, transmits, repeats, etc., wireless communication signals to a wireless terminal 104. Further, it is contemplated that system 100 may include a plurality of base stations similar to base station 102, such as 102n2 and 102nN, and/or a plurality of wireless terminals similar to wireless terminal 104, such as 104m2 and 104mM. It is to be appreciated that while the discussion will focus on the singular stations for clarity, aspects may involve multiple base stations and multiple wireless terminals. Base station 102 can comprise a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art. Base station 102 may be a fixed station and/or mobile. Wireless terminal 104 can be, for example, a cellular phone, a smart phone, a laptop, a handheld communication device, a handheld computing device, a satellite radio, a global positioning system, a PDA, and/or any other suitable device for communicating over wireless communication system 100. Also, wireless terminal 104 may be fixed or mobile.

Wireless terminal 104 may communicate with base station 102 (and/or disparate base station(s)) on a downlink and/or an uplink channel at any given moment. The downlink refers to the communication link from base station 102 to wireless terminal 104, and the uplink channel refers to the communication link from wireless terminal 104 to base station 102. Base station 102 may further communicate with other base station(s) and/or any disparate devices (e.g., servers) (not shown) that may perform functions such as, for example, authentication and authorization of wireless terminal 104, accounting, billing, and so on.

Base station 102 may further include a power controller 106 and a wireless terminal verifier 108. Power controller 106 may measure a power level associated with wireless terminal 104 (and/or any disparate wireless terminals). Further, power controller 106 may transmit power commands to wireless terminal 104 to facilitate adjusting the power level. For instance, power controller 106 may transmit a power command in one or more transmission units associated with a first subset of transmission units. The power commands, for instance, may indicate to increase a power level, decrease a power level, remain at a power level, and the like. Upon receipt of power commands to increase or decrease power, wireless terminal 104 may alter an associated power level a fixed (e.g., preset) and/or variable amount. The preset amounts may be of variable size based on certain factors (e.g. frequency reuse factors, channel conditions at different mobile stations). Further, wireless terminal verifier 108 may transmit information as a function of a terminal identifier related to a wireless terminal (e.g., wireless terminal 104) in one or more transmission units associated with a second subset of transmission units. Moreover, one or more ON identifiers may be assigned to each wireless terminal when in session ON state and the ON identifiers may be associated with the first subset and the second subset of transmission units. Transmission units may be in variable formats (e.g. time domain, frequency domain, hybrid of both time and frequency domains).

Power controller 106 may transmit power commands over a downlink power control channel (DLPCCH). Pursuant to an example, resources may be assigned to wireless terminal 104 by base station 102 as wireless terminal 104 accesses a session ON state; such resources may include particular DLPCCH segments, one or more ON identifiers, etc. The DLPCCH may be utilized by a base station sector attachment point (e.g., employing power controller 106) to transmit downlink power control messages to control transmission power of wireless terminal 104.

Wireless terminal verifier 108 may transmit information associated with a wireless terminal (e.g., wireless terminal 104) to which the power commands correspond along with the power commands transferred by power controller 106. For example, wireless terminal verifier 108 may transmit information as a function of a terminal identifier (e.g., scrambling mask) associated with the wireless terminal (e.g., wireless terminal 104). Wireless terminal verifier 108 may transfer such information over the DLPCCH. Pursuant to an illustration, information associated with wireless terminal 104 may be transmitted over the DLPCCH with a subset of the power command transmissions from power controller 106.

Wireless terminal 104 may further include a verification information comparator 110 that evaluates the received information associated with wireless terminal 104. Verification information comparator 110 may analyze the received information to determine whether wireless terminal 104 is utilizing resources as set forth by base station 102; thus, verification information comparator 110 may evaluate information included in the Q component of symbols transmitted over the DLPCCH. For instance, base station 102 may have assigned identifier(s) (e.g., session ON ID) to wireless terminal 104, and verification information comparator 110 may analyze whether wireless terminal 104 employs appropriate resources associated with the assigned identifier(s). According to other examples, verification information comparator 110 may determine whether wireless terminal 104 is utilizing segments of the DLPCCH allocated by base station 102 and/or whether base station 102 has reclaimed resources (e.g., session ON ID) previously assigned to wireless terminal 104.

Figure 2:
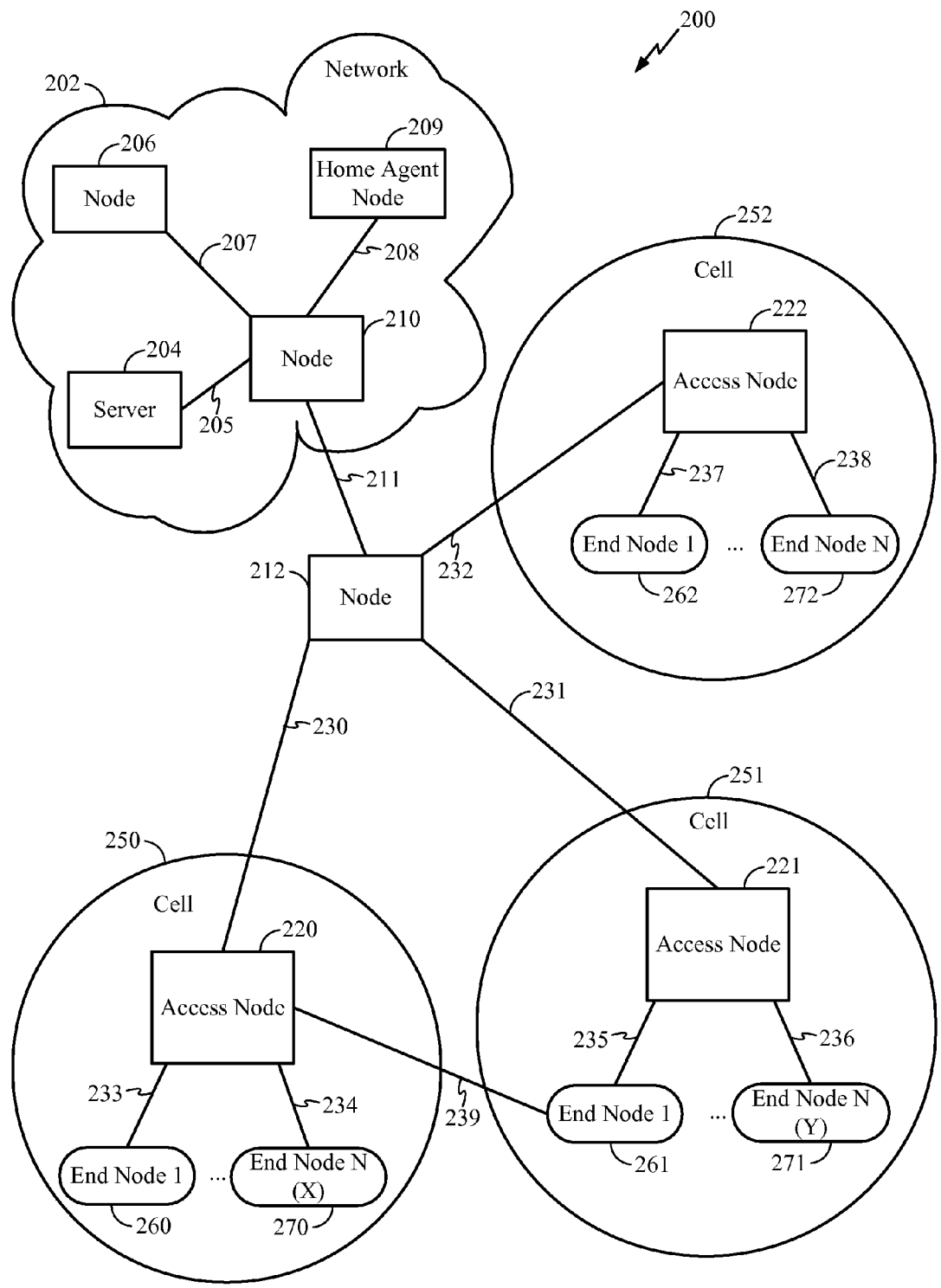
FIG. 2 is an illustration of an exemplary communication system (e.g., a cellular communication network) implemented in accordance with various aspects.

With reference to FIG. 2, illustrated is an exemplary communication system 200 (e.g., a cellular communication network) implemented in accordance with various aspects, which comprises a plurality of nodes interconnected by communications links 205, 207, 208, 211, 230, 231, 232, 233, 234, 235, 236, 237, 238, and 239. Nodes in exemplary communication system 200 exchange information using signals (e.g., messages) based on communication protocols (e.g., the Internet Protocol (IP)). The communications links of system 200 may be implemented, for example, using wires, fiber optic cables, and/or wireless communications techniques. Exemplary communication system 200 includes a plurality of end nodes 260, 270, 261, 271, 262, 272, which access communication system 200 via a plurality of access nodes 220, 221, and 222. End nodes 260, 270, 261, 271, 262, 272 may be, e.g., wireless communication devices or terminals, and access nodes 220, 221, 222 may be, e.g., wireless access routers or base stations. Exemplary communication system 200 also includes a number of other nodes 204, 206, 209, 210, and 212, used to provide interconnectivity or to provide specific services or functions. Specifically, exemplary communication system 200 includes a Server 204 used to support transfer and storage of state pertaining to end nodes. The Server node 204 may be an AAA server, a Context Transfer Server, a server including both AAA server functionality and Context Transfer server functionality.

Exemplary communication system 200 depicts a network 202 that includes Server 204, node 206 and a home agent node 209, which are connected to an intermediate network node 210 by corresponding network links 205, 207 and 208, respectively. Intermediate network node 210 in network 202 also provides interconnectivity to network nodes that are external from the perspective of network 202 via network link 211. Network link 211 is connected to another intermediate network node 212, which provides further connectivity to a plurality of access nodes 240, 241, 242 via network links 230, 231, 232, respectively.

Each access node 240, 240', 240" is depicted as providing connectivity to a plurality of M end nodes (260, 270), (261, 271), (262, 272), respectively, via corresponding access links (233, 234), (235, 236), (237, 238), respectively. In exemplary communication system 200, each access node 240, 241, 242 is depicted as using wireless technology (e.g., wireless access links) to provide access. A radio coverage area (e.g., communications cells 250, 251, and 252) of each access node 240, 241, 242, respectively, is illustrated as a circle surrounding the corresponding access node. In one aspect, end nodes may employ access links (239) to non-serving neighbor access nodes. Uplink and Downlink data may be transferred between the end node and a number of neighboring access nodes.

Exemplary communication system 200 is presented as a basis for the description of various aspects set forth herein. Further, various disparate network topologies are intended to fall within the scope of the claimed subject matter, where the number and type of network nodes, the number and type of access nodes, the number and type of end nodes, the number and type of Servers and other Agents, the number and type of links, and the interconnectivity between nodes may differ from that of exemplary communication system 200 depicted in FIG. 2. Additionally, functional entities depicted in exemplary communication system 200 may be omitted or combined. Also, the location or placement of the functional entities in the network may be varied.

Figure 3:
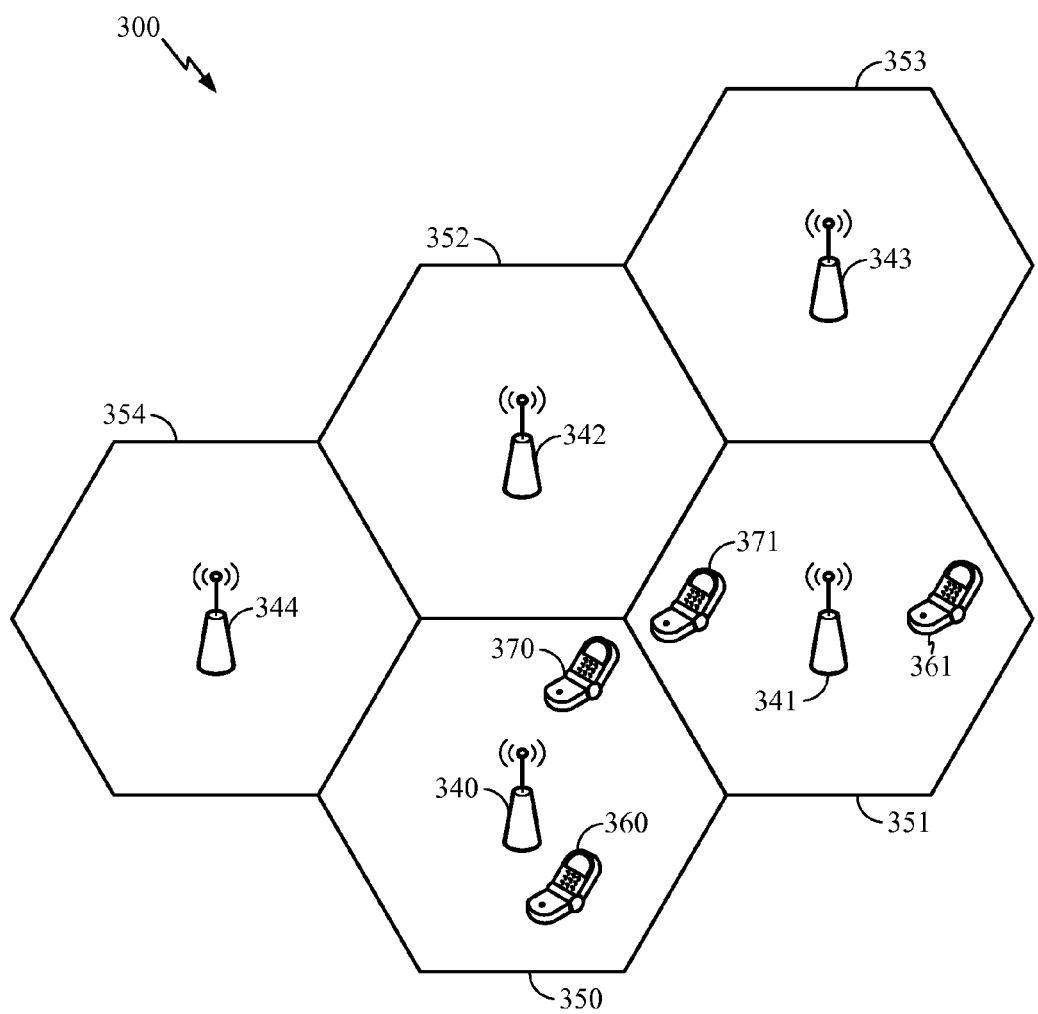
FIG. 3 is an illustration of an exemplary multi-cell system implemented with various aspects.

FIG. 3 illustrates an aspect of multi-cell environment. Cell 350 has end node 360 to end node 370 in its domain. Cell 351 has end node 361 to end node 371 in its domain. Cell 350 is portrayed as having neighbor cells 351, 352 and 354. Cell 351 is portrayed as having neighbor cells 350, 352 and 353. Cell 353 is not a neighbor of Cell 350.

Each cell has a base station that is predominantly controlling the end nodes in its cell. In each station, the base station's scheduler 120 has the flexibility to allocate variable bandwidth and PSD to the end nodes in its domain. End node 360 may be permitted to operate with a higher PSD than end node 370. The variability is desired to increase cell throughput and allow greater bandwidth and higher PSD to end nodes closer to the center of the cell (e.g. 360). If end node 370 were to transmit at a higher PSD, it would run the risk of creating interference for end node 371, which is located in neighboring cell 351.

Figure 4:
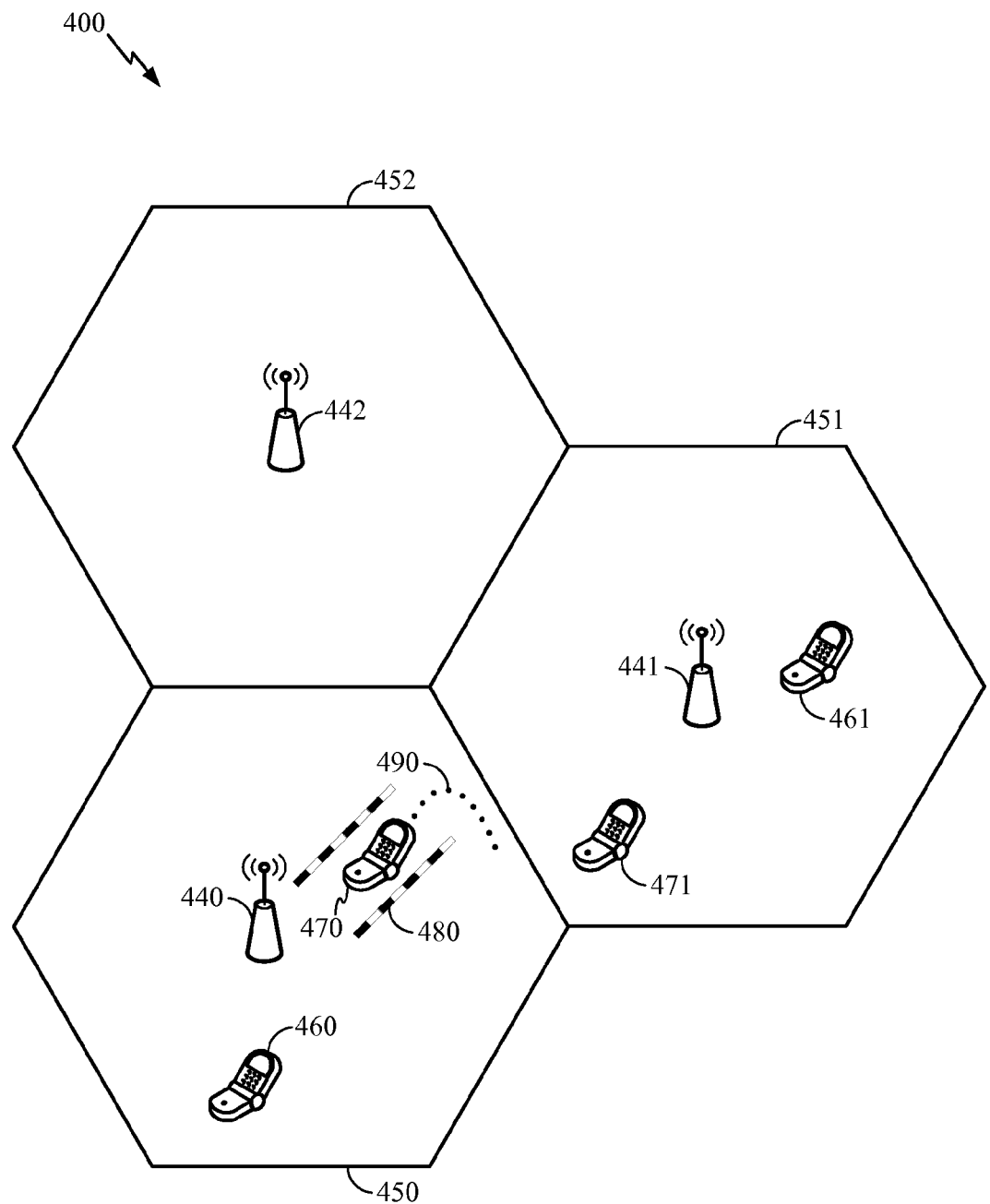
FIG. 4 is an illustration of an exemplary aspect of inter-cell interference that the present application controls.

FIG. 4 illustrates an aspect of inter-cell interference. End node 471 is stationary and near the edge of service cell 451. End node 461 also in cell 451 operates at an independent power and/or bandwidth than end node 471. There are two end nodes in neighbor cell 450. In cell 450, end node 470 is traveling through an urban canyon 480 with an increased PSD (e.g. a higher PSD than end node 460). End node 470 travels out of the canyon on path 490 turning in the direction of end node 471. The sudden exit from the urban canyon conditions and proximity to end node 471 causes a sharp rise in interference for end nodes 470 and 471 and a resulting large change in path loss function. It is noted that the path loss function is not solely tied to a serving cell, but is also a function of path loss from an end node to neighbor serving cells. In this example, the path loss with neighbor cell 452 has no effect. Also note that end node 471 has had no change in its PSD or commands from its own serving cell 451. Conventionally, base station 440 would be unaware of its interference caused to end node 471. An aspect allows open loop control to quickly mitigate the inter-cell interference and transition to a closed loop control at an appropriate time.

Figure 5:
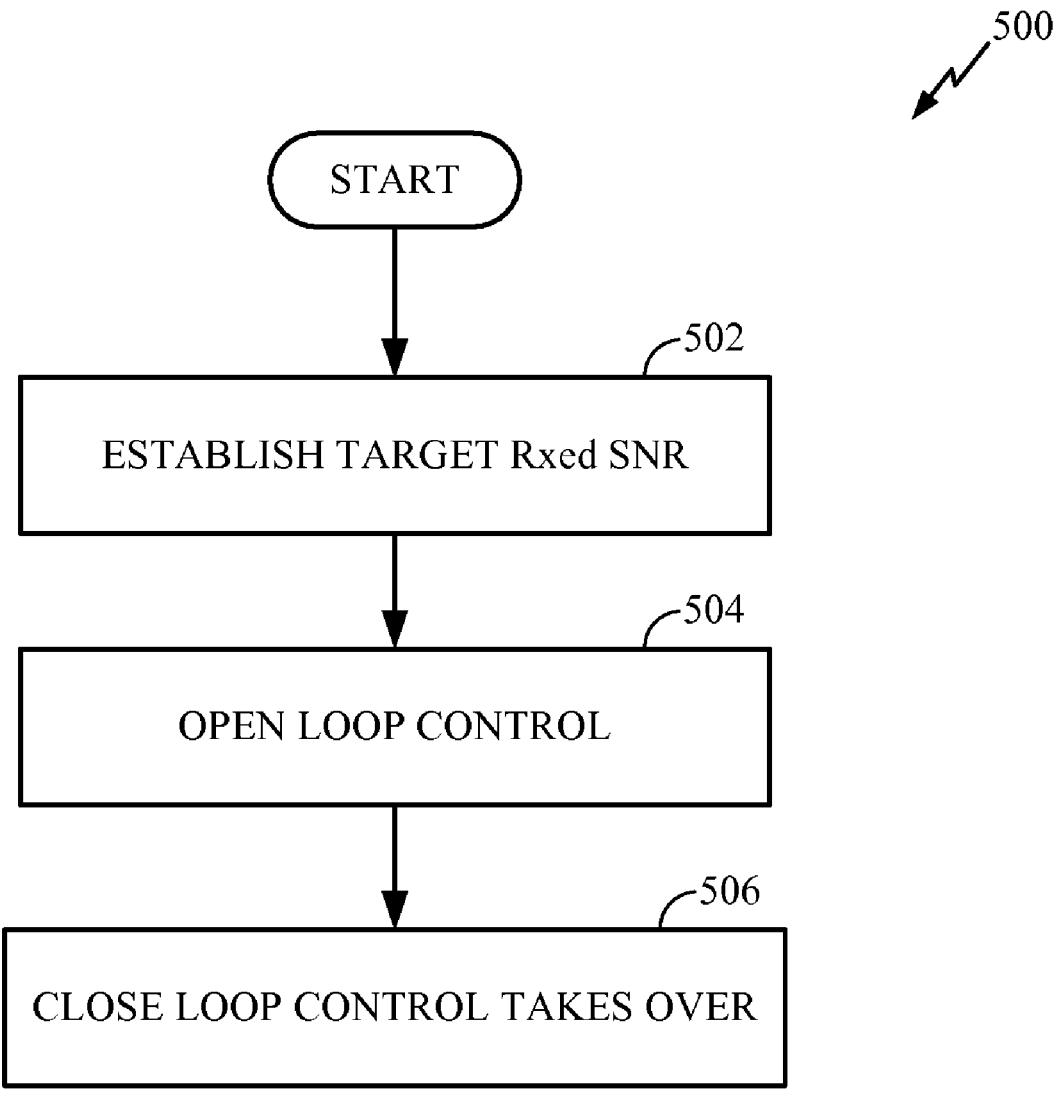
FIG. 5 presents a logic flow chart illustrating various aspects.
Figure 6:
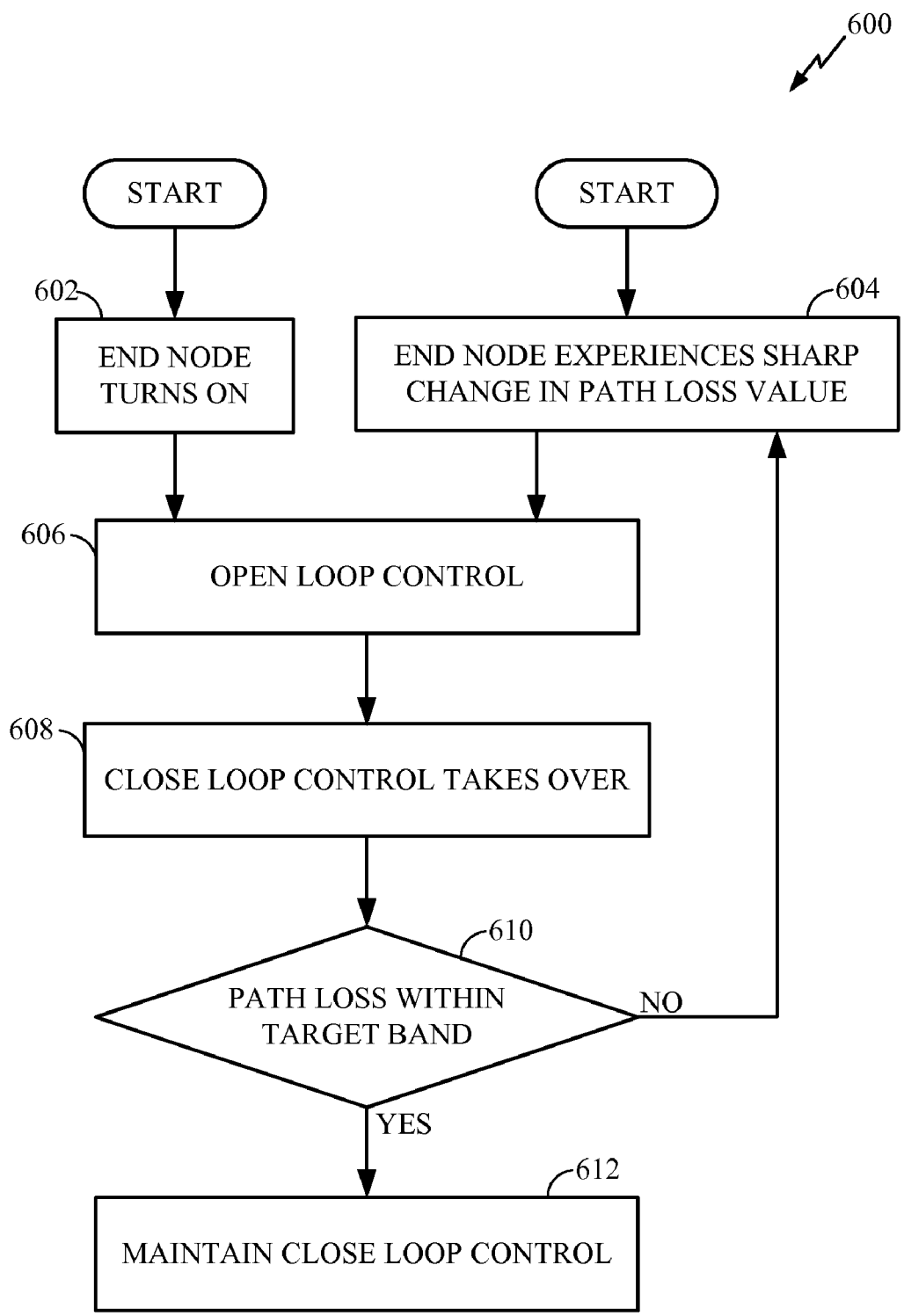
FIG. 6 presents a logic flow chart of the proposed open and closed loop control methodology.

FIG. 5 illustrates a management logic flow chart. At 502, the target Rxed SNR is established. This target is made a function of the path loss both from the end node to the serving node as well as the end node to the neighbor cell nodes. The end node may be as represented as item 700, FIG. 7. Open loop control 504 is initially used by the access node, as may be represented in FIG. 8, item 800. Open-loop power control has been widely used in the conventional wireless systems. The principle of the open-loop is to compensate for [a fraction of] the serving cell path loss so that a certain target SNR can be maintained from the long-term perspective. However, stand-alone open-loop approach does not take inter-cell interference into account. Meanwhile it also suffers from measurement errors. Load indicator is an effective way to control the inter-cell interference, however some extreme scenarios such as in urban canyon, an end node may turn around the corner and suddenly blast its power in another cell, traditional load commands may not be able to control the interference down to the target level fast enough. End node's transmit PSD is adjusted based on open-loop algorithm to allocate for a fast update based on the DL path loss. The open-loop algorithm may set different target Rxed SNR for different end nodes. The open-loop algorithm controls the interference level to some extent in the sense that the target Rxed SNR has been made as a function the path loss to the serving cell and neighboring non-serving cells. The novel aspect of including a path loss reading from non-serving cells is called inter-cell PC. FIG. 6 illustrates a management logic flow chart. From the end node's perspective, management begins when the User Equipment (UE) is turned on 602. At 602, the target Rxed SNR is established. This target is made a function of the path loss both from the end node to the serving node as well as the end node to the neighbor cell nodes. Entry into the cycle may also happen 604 when the end node experiences a drastic change in its path loss reading (e.g. when bombarded with interference from another end unit emerging from an urban canyon as presented in FIG. 4).

Figure 8:
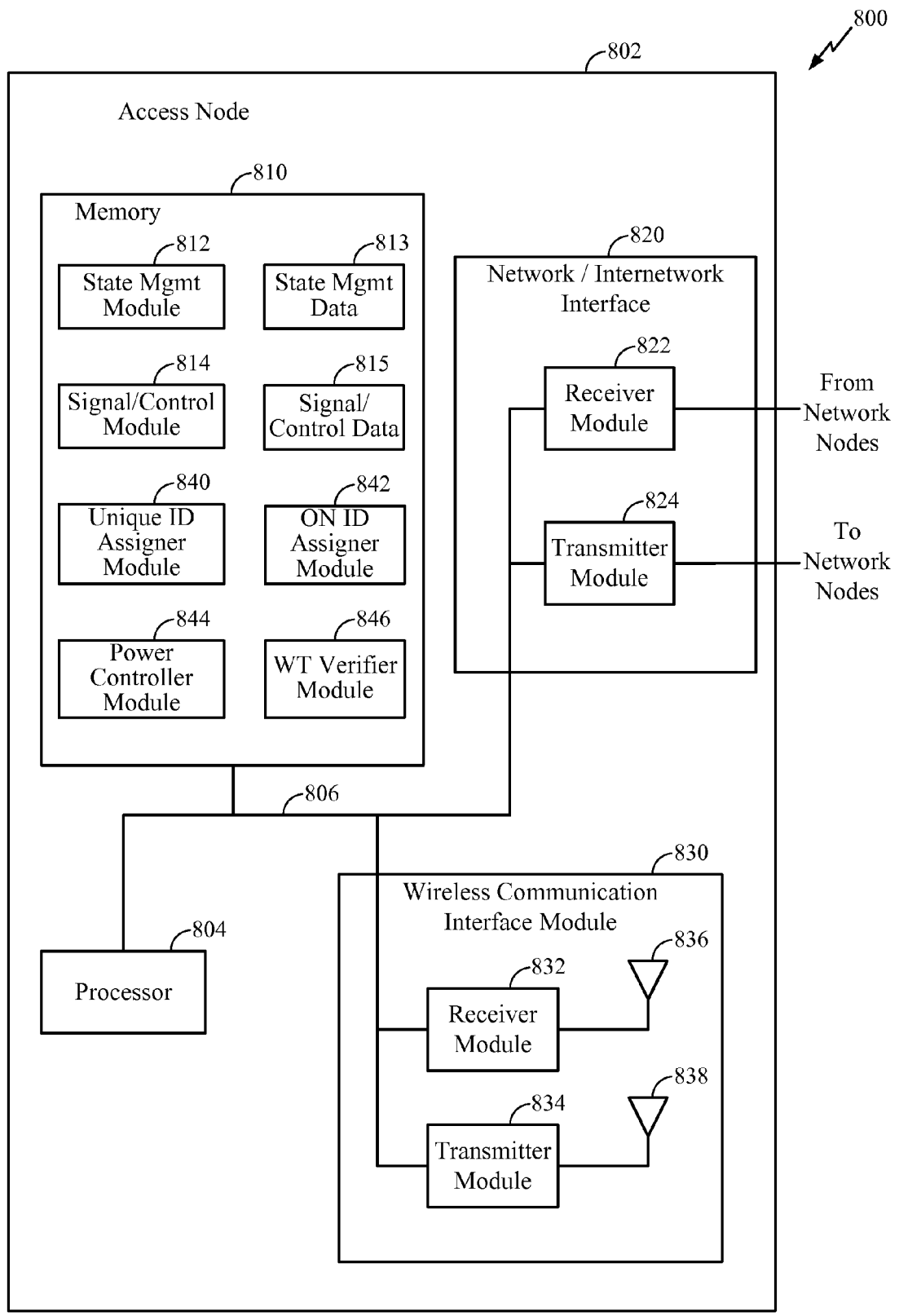
FIG. 8 is an illustration of an exemplary access node implemented in accordance with various aspects described herein.

Open loop control 606 is initially used by the access node, as may be represented in FIG. 8, item 800. Open-loop power control has been widely used in the conventional wireless systems. The principle of the open-loop is to compensate for [a fraction of] the serving cell path loss so that a certain target SNR can be maintained from the long-term perspective. However, stand-alone open-loop approach does not take inter-cell interference into account. Meanwhile it also suffers from measurement errors. Load indicator is an effective way to control the inter-cell interference, however some extreme scenarios such as in urban canyon, an end node may turn around the corner and suddenly blast its power in another cell, traditional load commands may not be able to control the interference down to the target level fast enough. End node's transmit PSD is adjusted based on open-loop algorithm to allocate for a fast update based on the DL path loss. The open-loop algorithm may set different target Rxed SNR for different end nodes.

As the open-loop algorithm does not have tight control on the interference injected into other neighboring cells, once an initial pass is made by the open loop control and a target Rxed SNR has been established, the end node loop control changes to closed loop control 608. These levels may be held in the appropriate memory stores as in item 710 FIG. 7 and item 810 FIG. 8. The end node, as may be represented by item 700 FIG. 7, then updates its transmit PSD by listening to the load indicators from the serving cell and at least one other neighboring non-serving cell which generates the highest level of interference. The method of how the end node obtains the other cell load indicators may be variable (e.g. the end node can obtain through internode B or direct listening to other cells).

Figure 7:
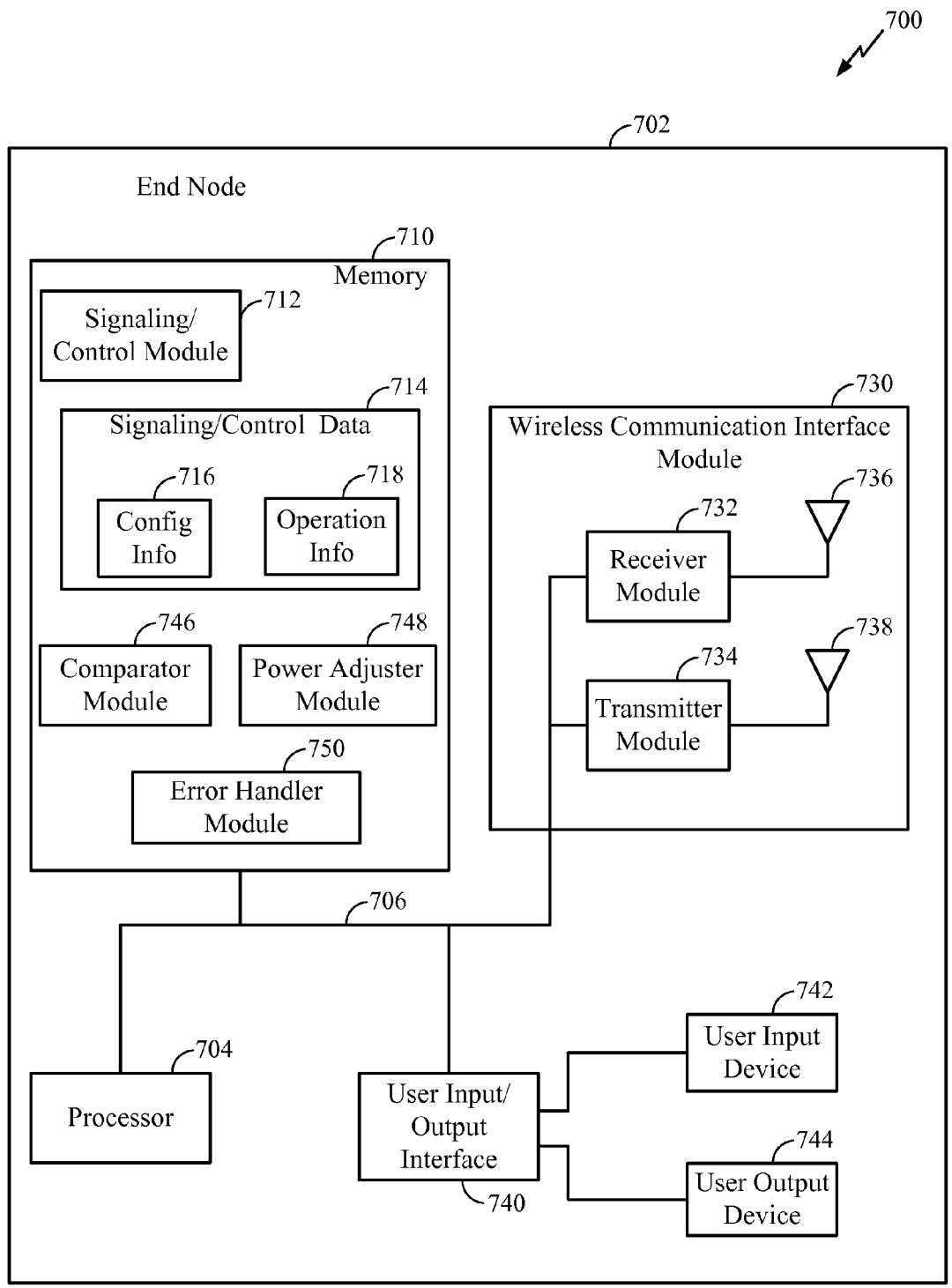
FIG. 7 is an illustration of an exemplary end node (e.g., a mobile node) associated with various aspects.

From a high level perspective, the proposed closed loop PSD control algorithm incorporates the action that each cell broadcasts an uplink load indicator (busy or not) in the downlink in a periodic manner as may be indicated through items 824 and 834 FIG. 8, and each end node decodes the load indicator bits, as may be indicated by item 712 FIG. 7, from at least one dominant interfering cell (based on path loss measurements), and the end node appropriately reduces, holds or increase its allowed Tx power spectral density based on the serving cell and nonserving neighboring cells through an exemplary device such as item 748 in FIG. 7. When the load commands are sent through inter eNode-B communications via backhaul, the serving cell adjusts the Tx PSD of the UE based on the received load commands from the neighboring cells. The adjustment can be subsumed in the scheduling commands or it can be done by serving cell sending down the load commands to the UE. The UE monitors its path loss function 610. The closed loop control remains in effect while the path loss function remains within a threshold level 612. If the path loss function falls out of the threshold target band 604, the control method reverts to open loop control 606.

The closed loop protocol includes a reference PSD that is maintained at the serving cell (Node-B) and is used for intra cell power control. This reference PSD is based on a periodic known signal such as CQI. The end node periodically reports a PSD delta and a supportable bandwidth. The reference PSD delta is a function of load indication commands from non-serving cells and indicates the power headroom available at the end node assuming that the assigned (granted) bandwidth for data transmission equals the CQI bandwidth. The supportable bandwidth is computed from the maximum transmit power and the Tx PSD and indicates the maximum bandwidth that may be supported by the end node, given the max Tx power constraint and the PSD at which end node transmits data. The serving node then grants an uplink assignment consisting of bandwidth (e.g. number of tones), which should be lower than the supportable bandwidth and packet format (e.g. packet size and modulation). The end node transmits the packet in accordance with the assignment with the PSD delta. Inter-cell power control is performed in part by the end node listening to load indication commands from the strongest interfering cell. In one aspect, load indications may be generated by comparing the filtered IoT with the target operating point and transmitted once every 10 ms using OOK. The up/down step size to adjust the PSD offset may be variable.

Note that the PSD adjustment corresponding to load commands in closed loop power control may not be as drastic as that corresponding to open-loop. As load indicators indicate the interference level seen by other cells a tight interference control can be achieved. Therefore, with the proposed approach a fast and tight interference control can be obtained.

Test results indicate that without inter-cell PC, the initial PSD setting is crucial for system performance. This initial PSD setting is typically set by the access node without full knowledge of the variability of a number of factors. These factors vary per end node and include factors outside of the control of the end node.

FIG. 7 illustrates an exemplary end node 700 (e.g., a mobile node, a wireless terminal) associated with various aspects. Exemplary end node 700 may be an apparatus that may be used as any one of the end nodes 260, 270, 261, 271, 262, 272 depicted in FIG. 2. As depicted, end node 700 includes a processor 704, a wireless communication interface 730, a user input/output interface 740 and memory 710 coupled together by a bus 706. Accordingly, various components of end node 700 can exchange information, signals and data via bus 706. Components 704, 706, 710, 730, 740 of end node 700 may be located inside a housing 702.

Wireless communication interface 730 provides a mechanism by which the internal components of the end node 700 can send and receive signals to/from external devices and network nodes (e.g., access nodes). Wireless communication interface 730 includes, for example, a receiver module 732 with a corresponding receiving antenna 736 and a transmitter module 734 with a corresponding transmitting antenna 738 used for coupling end node 700 to other network nodes (e.g., via wireless communications channels).

Exemplary end node 700 also includes a user input device 742 (e.g., keypad) and a user output device 744 (e.g., display), which are coupled to bus 706 via user input/output interface 740. Thus, user input device 742 and user output device 744 can exchange information, signals and data with other components of end node 700 via user input/output interface 740 and bus 706. User input/output interface 740 and associated devices (e.g., user input device 742, user output device 744) provide a mechanism by which a user can operate end node 700 to accomplish various tasks. In particular, user input device 742 and user output device 744 provide functionality that allows a user to control end node 700 and applications (e.g., modules, programs, routines, functions, etc.) that execute in memory 710 of end node 700.

Processor 704 may be under control of various modules (e.g., routines) included in memory 710 and may control operation of end node 700 to perform various signaling and processing as described herein. The modules included in memory 710 are executed on startup or as called by other modules. Modules may exchange data, information, and signals when executed. Modules may also share data and information when executed. Memory 710 of end node 700 may include a signaling/control module 712 and signaling/control data 714.

Signaling/control module 712 controls processing relating to receiving and sending signals (e.g., messages) for management of state information storage, retrieval, and processing. Signaling/control data 714 includes state information such as, for instance, parameters, status, and/or other information relating to operation of the end node. In particular, signaling/control data 714 may include configuration information 716 (e.g., end node identification information) and operational information 718 (e.g., information about current processing state, status of pending responses, etc.). Signaling/control module 712 may access and/or modify signaling/control data 714 (e.g., update configuration information 716 and/or operational information 718).

Memory 710 of end node 700 may also include a comparator module 746, a power adjuster module 748, and/or an error handler module 750. Although not depicted, it is to be appreciated that comparator module 746, power adjuster module 748, and/or error handler module 750 may store and/or retrieve data associated therewith that may be stored in memory 710. Comparator module 746 may evaluate received information associated with end node 700 and effectuate a comparison with expected information.

FIG. 8 provides an illustration of an exemplary access node 800 implemented in accordance with various aspects described herein. Exemplary access node 800 may be an apparatus utilized as any one of access nodes 240, 241, 242 depicted in FIG. 2. Access node 800 may include a processor 804, memory 810, a network/internetwork interface 820 and a wireless communication interface 830, coupled together by a bus 806. Accordingly, various components of access node 800 can exchange information, signals and data via bus 806. The components 804, 806, 810, 820, 830 of the access node 800 may be located inside a housing 802.

Network/internetwork interface 820 provides a mechanism by which the internal components of access node 800 can send and receive signals to/from external devices and network nodes. Network/internetwork interface 820 includes a receiver module 822 and a transmitter module 824 used for coupling access node 800 to other network nodes (e.g., via copper wires or fiber optic lines). Wireless communication interface 830 also provides a mechanism by which the internal components of access node 800 can send and receive signals to/from external devices and network nodes (e.g., end nodes). Wireless communication interface 830 includes, for instance, a receiver module 832 with a corresponding receiving antenna 836 and a transmitter module 834 with a corresponding transmitting antenna 838. Wireless communication interface 830 may be used for coupling access node 800 to other network nodes (e.g., via wireless communication channels).

Processor 804 may be under control of various modules (e.g., routines) included in memory 810 and may control operation of access node 800 to perform various signaling and processing. The modules included in memory 810 may be executed on startup or as called by other modules that may be present in memory 810. Modules may exchange data, information, and signals when executed. Modules may also share data and information when executed. By way of example, memory 810 of access node 800 may include a State Management module 812 and a Signaling/Control module 814. Corresponding to each of these modules, memory 810 also includes State Management data 813 and the Signaling/Control data 815.

State Management Module 812 controls the processing of received signals from end nodes or other network nodes regarding state storage and retrieval. State Management Data 813 includes, for instance, end-node related information such as the state or part of the state, or the location of the current end node state if stored in some other network node. State Management module 812 may access and/or modify State Management data 813.

Signaling/Control module 814 controls the processing of signals to/from end nodes over wireless communication interface 830 and to/from other network nodes over network/internetwork interface 820 as necessary for other operations such as basic wireless function, network management, etc. Signaling/Control data 815 includes, for example, end-node related data regarding wireless channel assignment for basic operation, and other network-related data such as the address of support/management servers, configuration information for basic network communications. Signaling/Control module 814 may access and/or modify Signaling/Control data 815.

Memory 810 may additionally include a unique identification (ID) assigner module 840, an ON identification (ID) assigner module 842, a power controller module 844, and/or a wireless terminal (WT) verifier module 846. It is to be appreciated that unique ID assigner module 840, ON ID assigner module 842, power controller module 844, and/or WT verifier module 846 may store and/or retrieve associated data retained in memory 810. Further, unique ID assigner module 840 may allocate a terminal identifier (e.g., scrambling mask) to a wireless terminal. ON ID assigner module 842 may assign an ON identifier to a wireless terminal while the wireless terminal is in session ON state. Power controller module 844 may transmit power control information to a wireless terminal or to other access nodes. WT verifier module 846 may enable including wireless terminal related information in a transmission unit.

Figure 9:
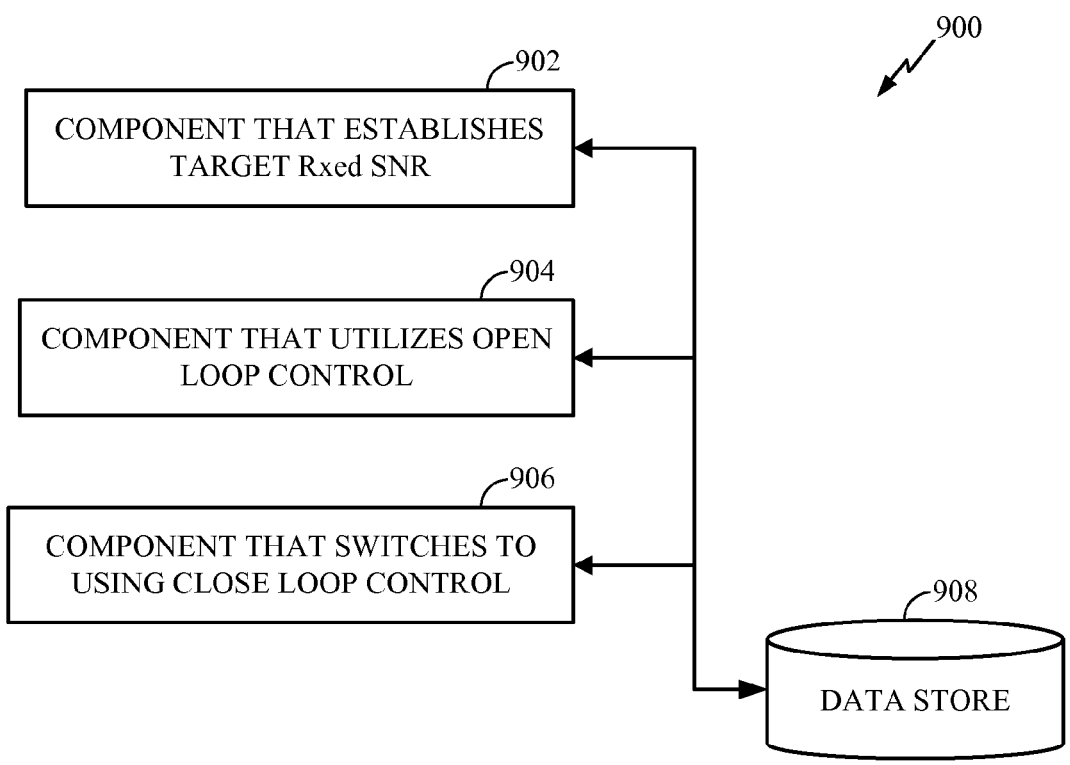
FIG. 9 presents a logic flow chart illustrating various aspects.

FIG. 9 illustrates a system 900 in accordance with an aspect. Component 902 establishes a target Rxed which is a function of the path loss both from the end node to the serving node as well as the end node to the neighbor cell nodes. The end node may be as represented as item 700, FIG. 7. Open loop control 504 is initially used by the access node, as may be represented in FIG. 8, item 800. End node's transmit PSD is adjusted based on open-loop algorithm to allocate for a fast update based on the DL path loss. The open-loop algorithm may set different target Rxed SNR for different end nodes. At an appropriate time, closed loop control replaces open loop control. Component 904 utilizes open loop control, and component 906 switches to using closed loop control.

Figure 10:
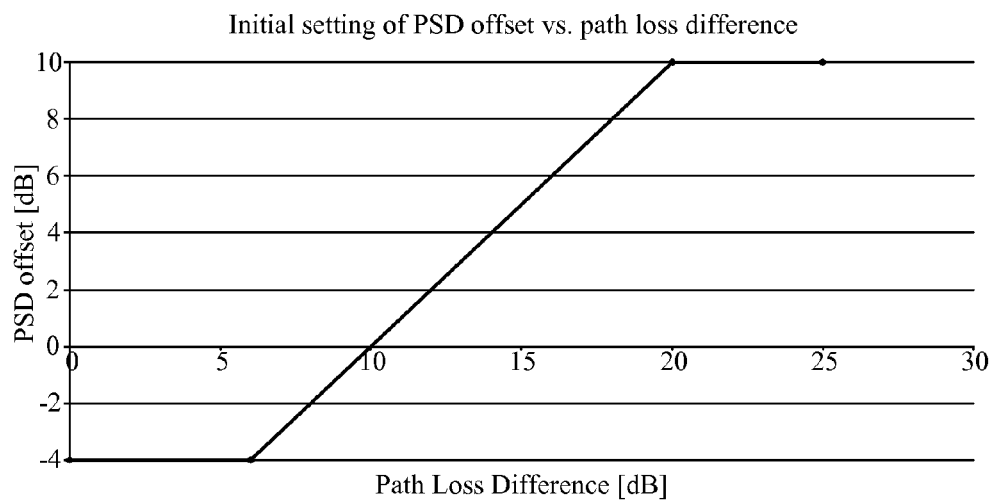
FIG. 10 presents exemplary initial open loop power control offsets implemented in accordance with various aspects.
Figure 11:
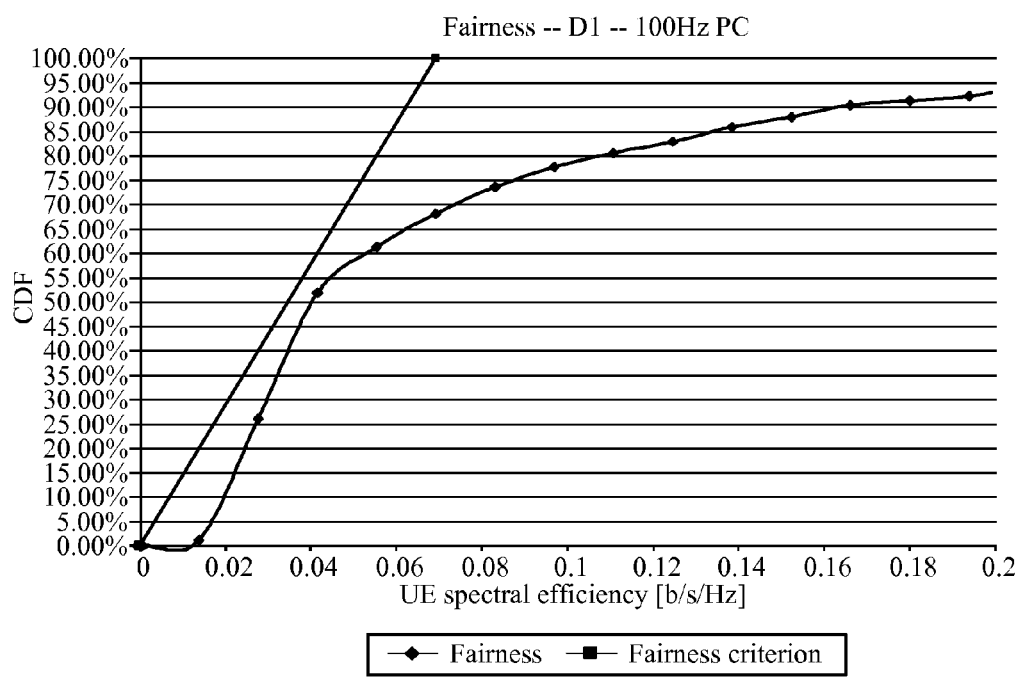
FIG. 11 presents testing results in accordance with various aspects set forth herein.
Figure 12:
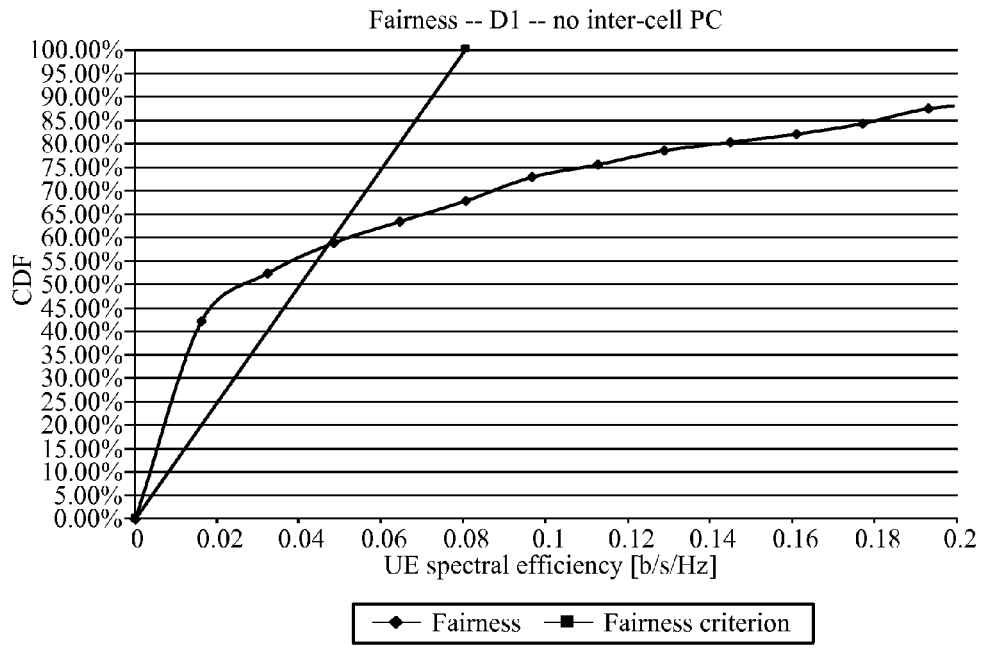
FIG. 12 presents testing results in accordance with various aspects.
Figure 13:
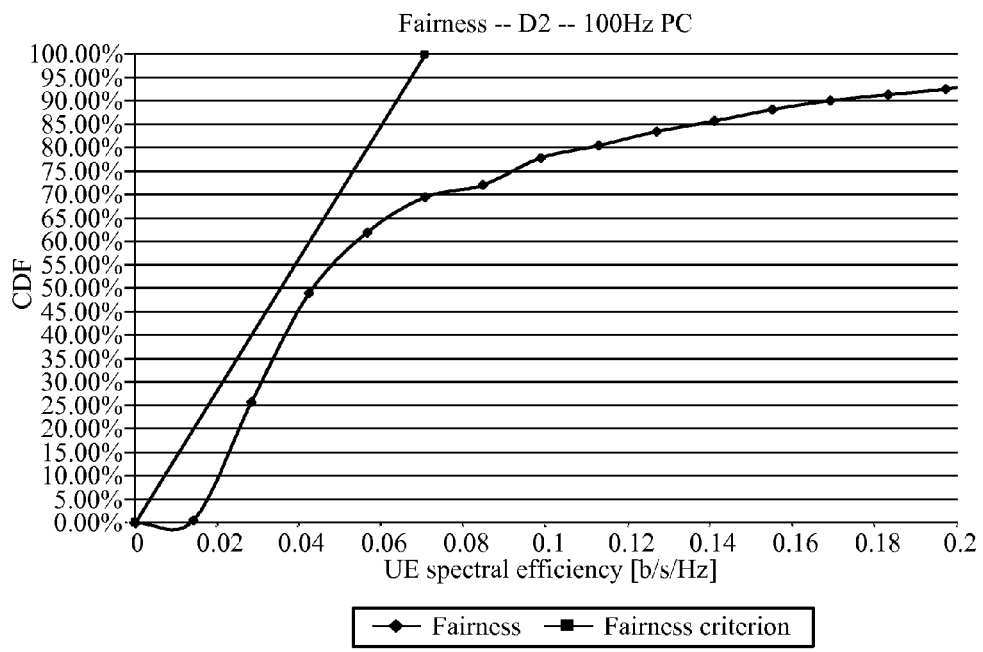
FIG. 13 presents testing results in accordance with various aspects.
Figure 14:
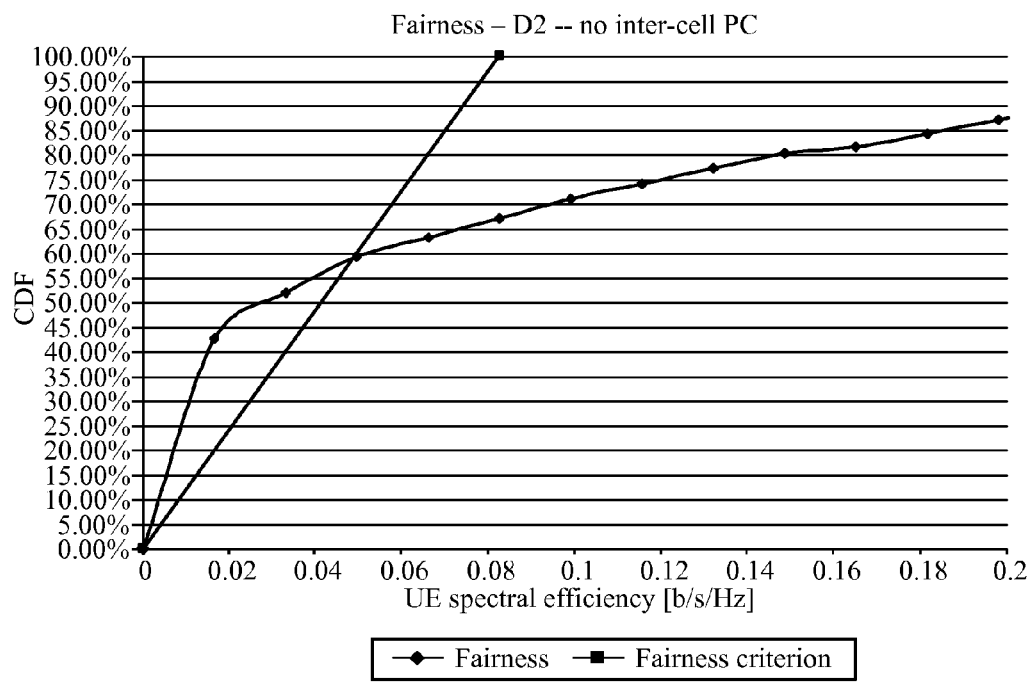
FIG. 14 presents testing results in accordance with various aspects.
Figure 15:
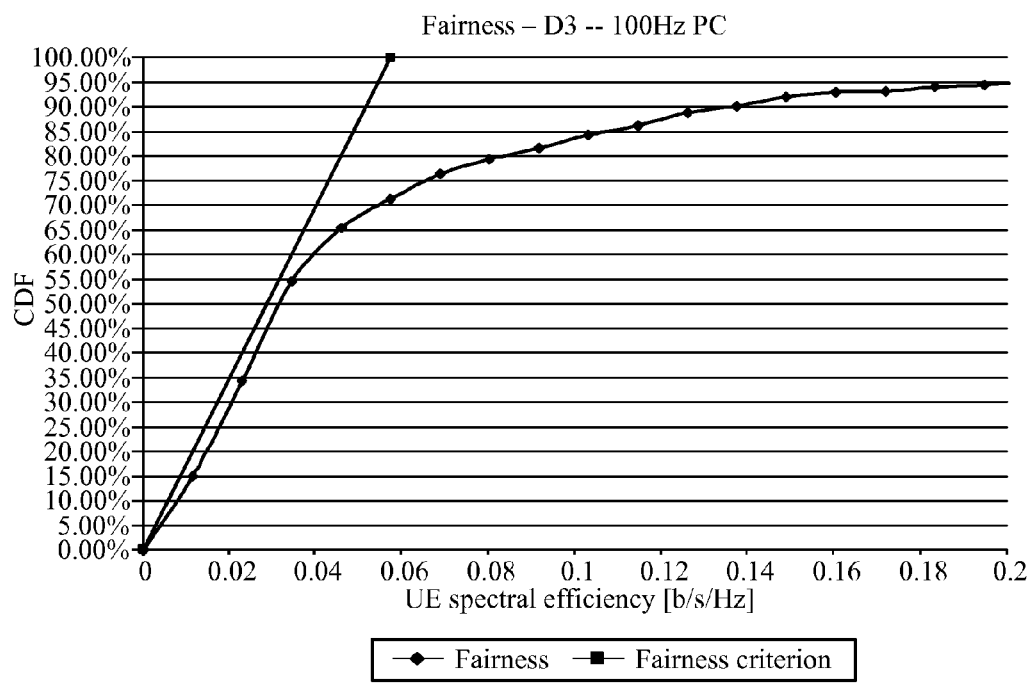
FIG. 15 presents testing results in accordance with various aspects.
Figure 16:
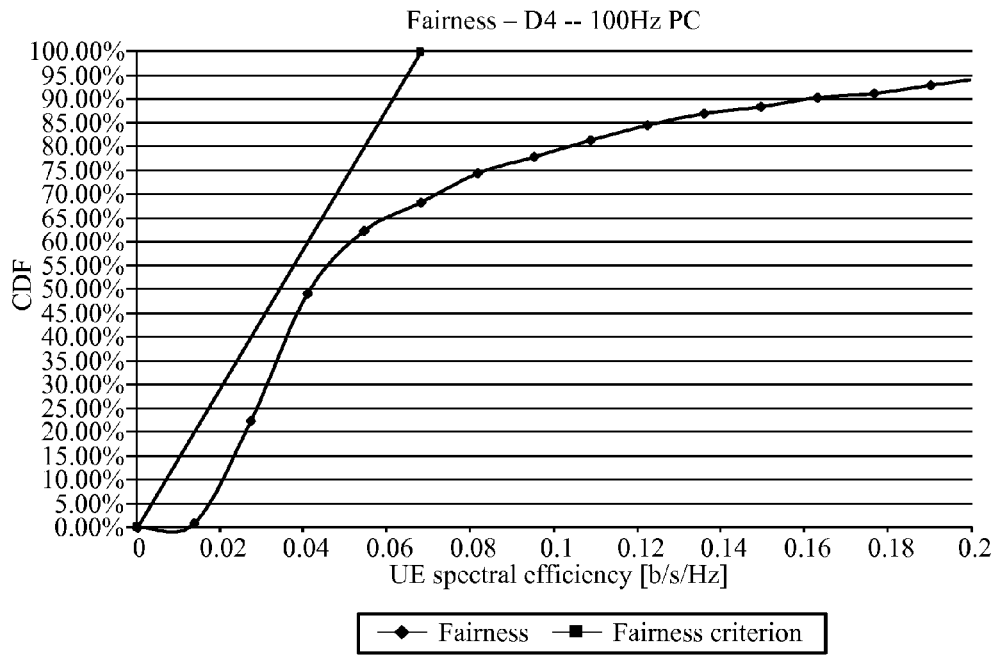
FIG. 16 presents testing results in accordance with various aspects.
Figure 17:
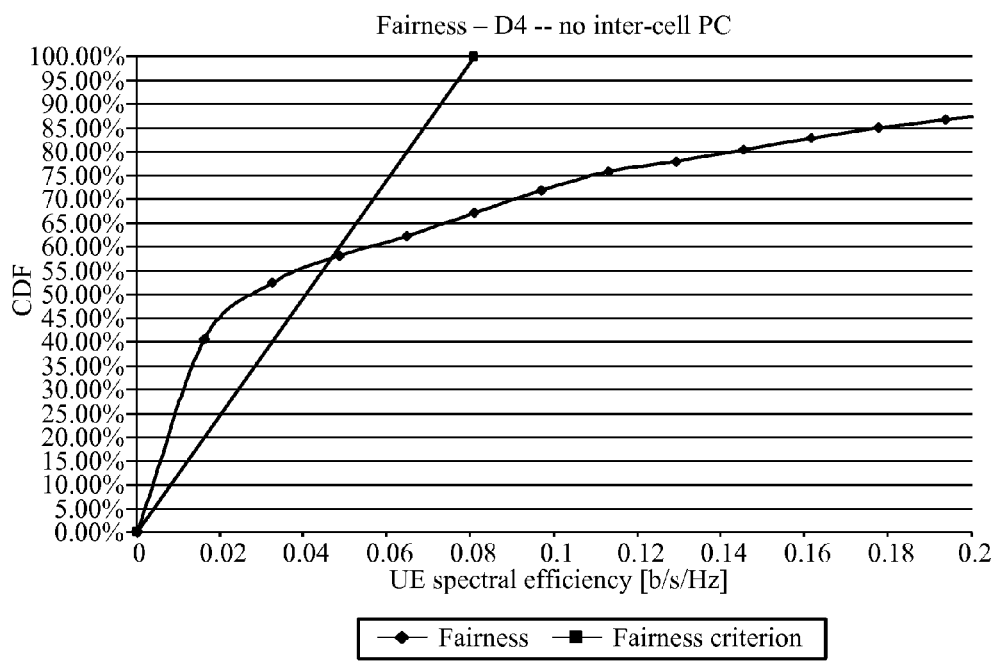
FIG. 17 presents testing results in accordance with various aspects.

The following is an aspect displaying results of experimentation with inter-cell power control. Inter-cell power control is done by the UE listening to load indication commands from the strongest interfering cell. Load indications are generated by comparing the filtered IoT with the target operating point and transmitted once every 10 ms using OOK. The up/down step size to adjust the PSD offset is 0.05 dB with scenarios D1, D2 and D4 and it is 0.5 dB with D3. In Tables 1 and 2, we show the system performance in terms of mean operating IoT, average cell throughput and the 5% edge UE throughput with and without inter-cell power control. Fairness plots for different link budgets are shown in FIGS. 11 to 17, respectively. The fairness is defined as the CDF of the UE spectral efficiency. The initial/open loop PSD offsets with inter-cell power control are shown in FIG. 10. Results in Tables 1 and 2 are with the same initial PSD setting as given in FIG. 10. With the given initial setting as in FIG. 10, a larger step size (0.5 dB) is needed to operate the system as desired. The larger variation resulting from the larger step size makes the system performance slightly worse than the fine tuned ones. It is to be appreciated that without inter-cell power control, an initial setting may not yield any meaningful results due to larger ISD and higher penetration loss inherent in conditions of link budget D3, and therefore Table 2 has entries of "N/A".

TABLE 1

System throughput with inter-cell power control

| Link Budget | Site-to-site Distance (m) | Speed (kph) | Mean IoT (dB) | Spectral Efficiency (b/s/Hz) | 5% Spectral Efficiency (b/s/Hz) |
|---|---|---|---|---|---|
| D1 | 500 | 3 | 4.43 | 0.69 | 0.017 |
| D2 | 500 | 30 | 4.41 | 0.71 | 0.017 |
| D3 | 1732 | 3 | 4.40 | 0.57 | 0.004 |
| D4 | 1000 | 3 | 4.44 | 0.68 | 0.017 |

TABLE 2

System throughput without inter-cell power control - same
initial PSD setting

| Link Budget | Site-to-site Distance (m) | Speed (kph) | Mean IoT (dB) | Spectral Efficiency (b/s/Hz) | 5% Spectral Efficiency (b/s/Hz) |
|---|---|---|---|---|---|
| D1 | 500 | 3 | 2.94 | 0.81 | 0.002 |
| D2 | 500 | 30 | 3.01 | 0.82 | 0.002 |
| D3 | 1732 | 3 | N/A | N/A | N/A |
| D4 | 1000 | 3 | 2.97 | 0.81 | 0.002 |

These results demonstrate that with the same initial setting, the system may be operated very tightly at the target IoT with reasonable fairness when there is inter-cell power control; and when there is no inter-cell power control the fairness criterion cannot be met even though the system throughput is higher. As mentioned supra, this is due to severe penalty imposed on the edge UEs with some initial settings. With the inter-cell power control enabled, initial PSD setting is less suspect to the losses thus encountered as it will be adaptively updated by the load indication; When there is no inter-cell power control, the initial PSD setting is may have strong impact to system performance. This can be evidenced in more detail by examining the test results with modified initial PSD settings as with Tables 3 and 4.

TABLE 3

System throughput without inter-cell power control - modified
initial PSD setting I

| Link Budget | Site-to-site Distance (m) | Speed (kph) | Mean IoT (dB) | Spectral Efficiency (b/s/Hz) | 5% Spectral Efficiency (b/s/Hz) |
|---|---|---|---|---|---|
| D1 | 500 | 3 | 5.76 | 0.75 | 0.017 |
| D2 | 500 | 30 | 5.97 | 0.81 | 0.017 |
| D3 | 1732 | 3 | 3.48 | 0.51 | 0.005 |
| D4 | 1000 | 3 | 5.68 | 0.75 | 0.017 |

TABLE 4

System throughput without inter-cell power control - modified
initial PSD setting II

| Link Budget | Site-to-site Distance (m) | Speed (kph) | Mean IoT (dB) | Spectral Efficiency (b/s/Hz) | 5% Spectral Efficiency (b/s/Hz) |
|---|---|---|---|---|---|
| D1 | 500 | 3 | 4.53 | 0.77 | 0.004 |
| D2 | 500 | 30 | 4.47 | 0.82 | 0.004 |
| D3 | 1732 | 3 | 3.95 | 0.56 | 0.005 |
| D4 | 1000 | 3 | 4.46 | 0.78 | 0.004 |

Figure 18:
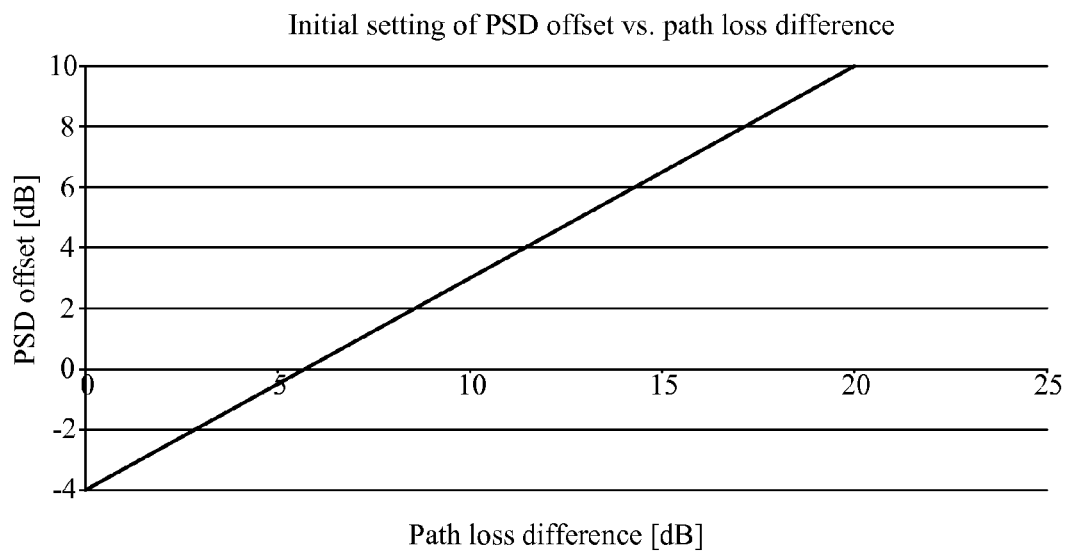
FIG. 18 presents exemplary initial open loop power control offsets implemented in accordance with various aspects.
Figure 19:
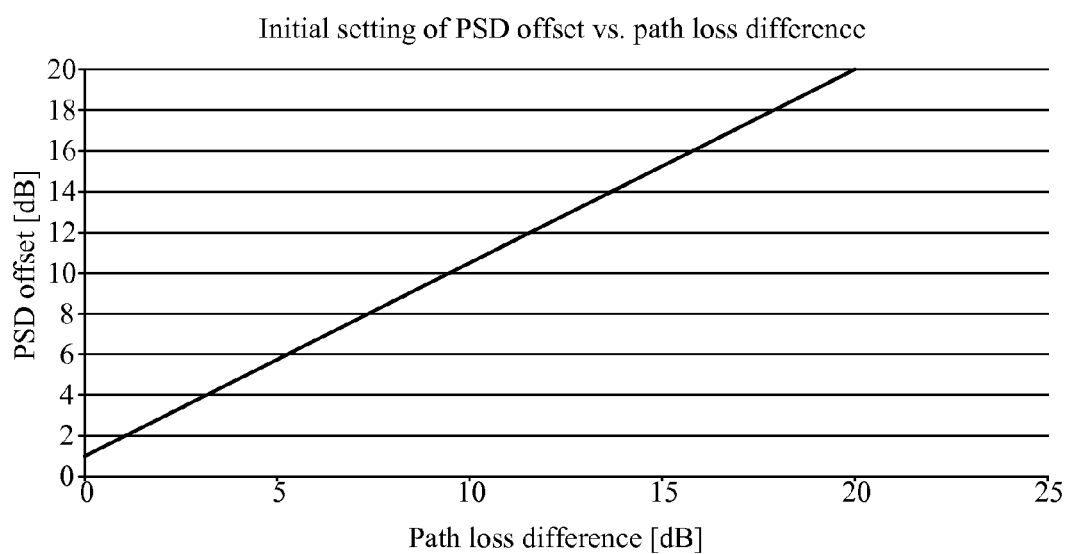
FIG. 19 presents exemplary initial open loop power control offsets implemented in accordance with various aspects.
Figure 20:
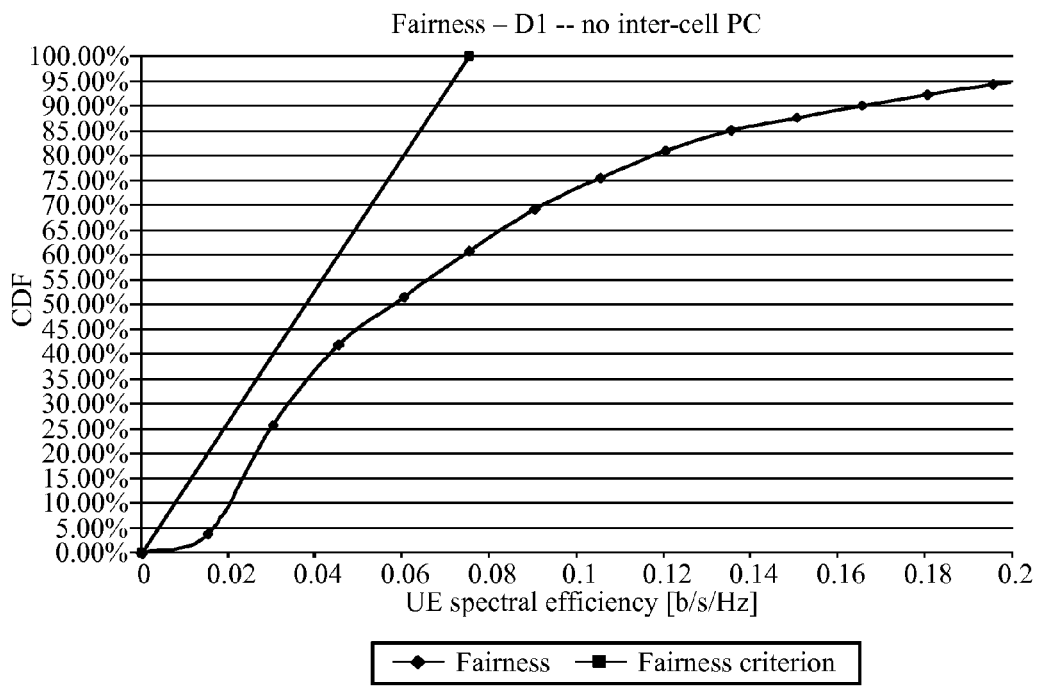
FIG. 20 presents testing results in accordance with various aspects set forth herein.
Figure 21:
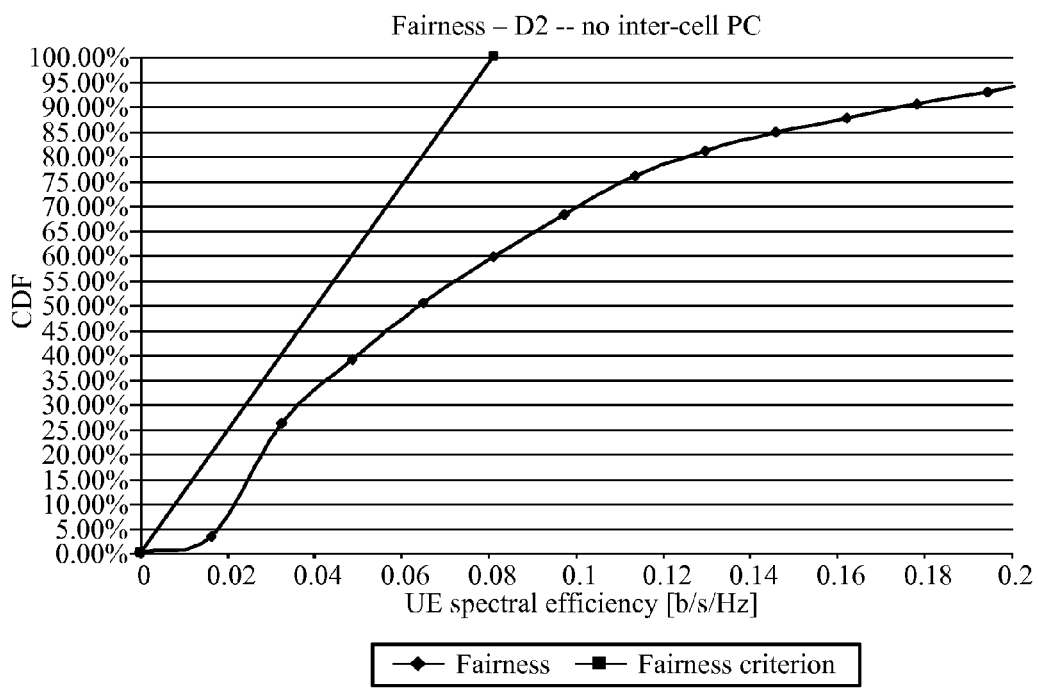
FIG. 21 presents testing results in accordance with various aspects.
Figure 22:
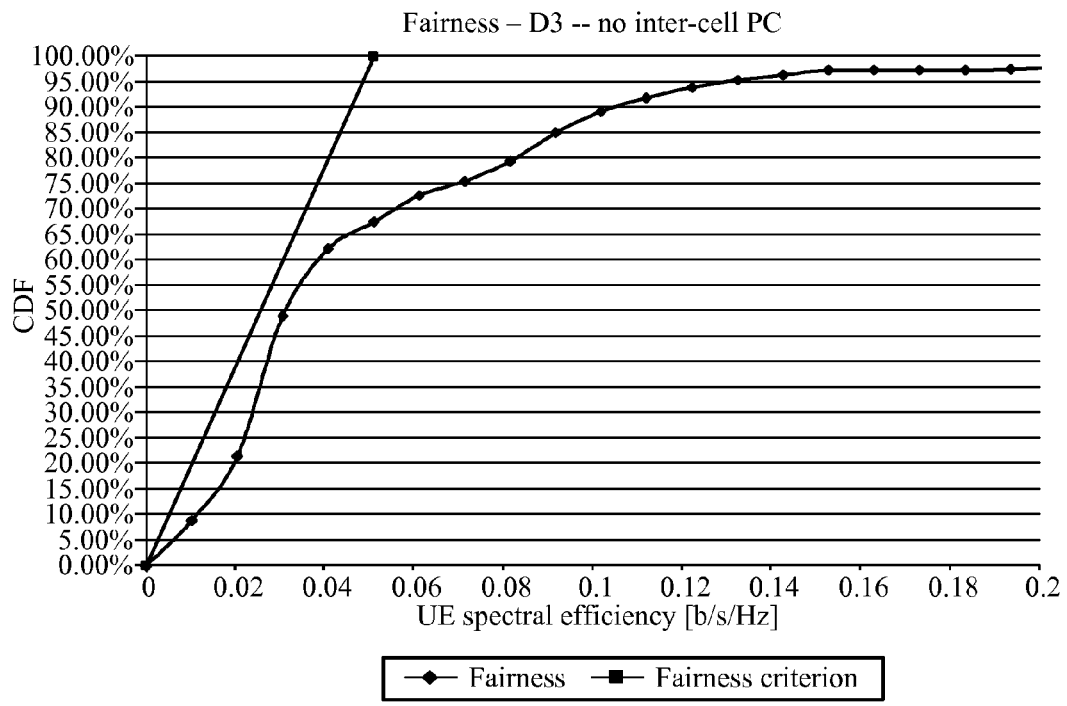
FIG. 22 presents testing results in accordance with various aspects.
Figure 23:
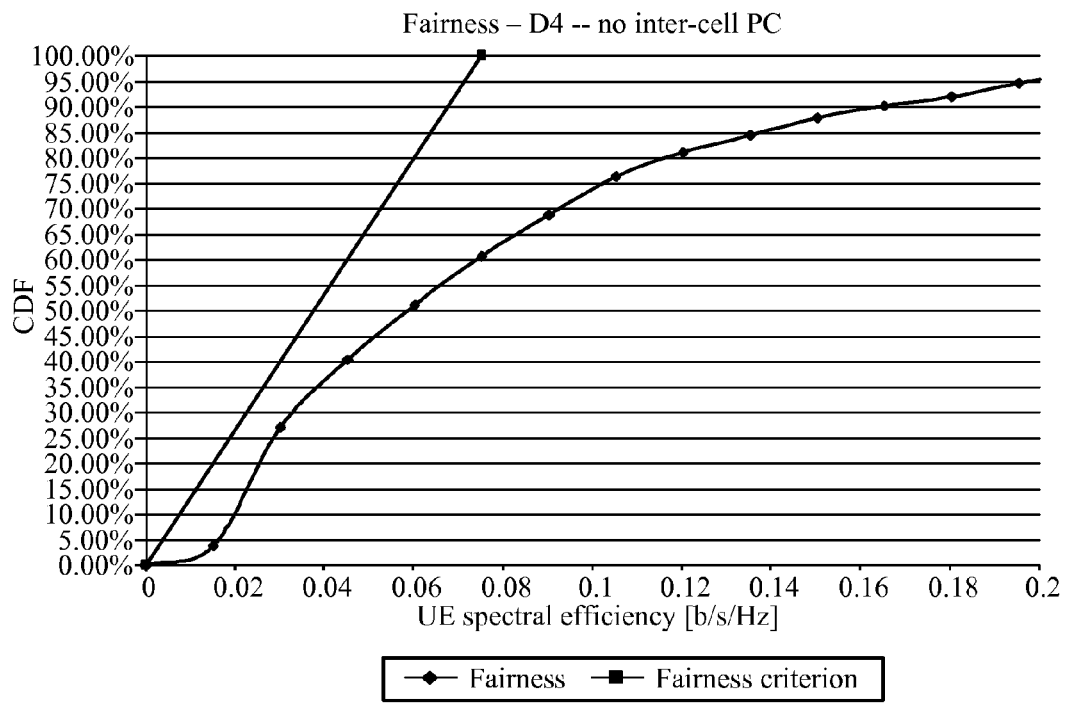
FIG. 23 presents testing results in accordance with various aspects.

The results in Table 3 with D1, D2 and D4 are with the initial mapping given in FIG. 18 while D3 is with mapping in FIG. 19. The corresponding fairness plots are given in FIGS. 20 to 23. Demonstrated are the new set of results which may meet the fairness criterion, however, the system IoT is higher than the target operation point 4.5 dB.

Figure 24:
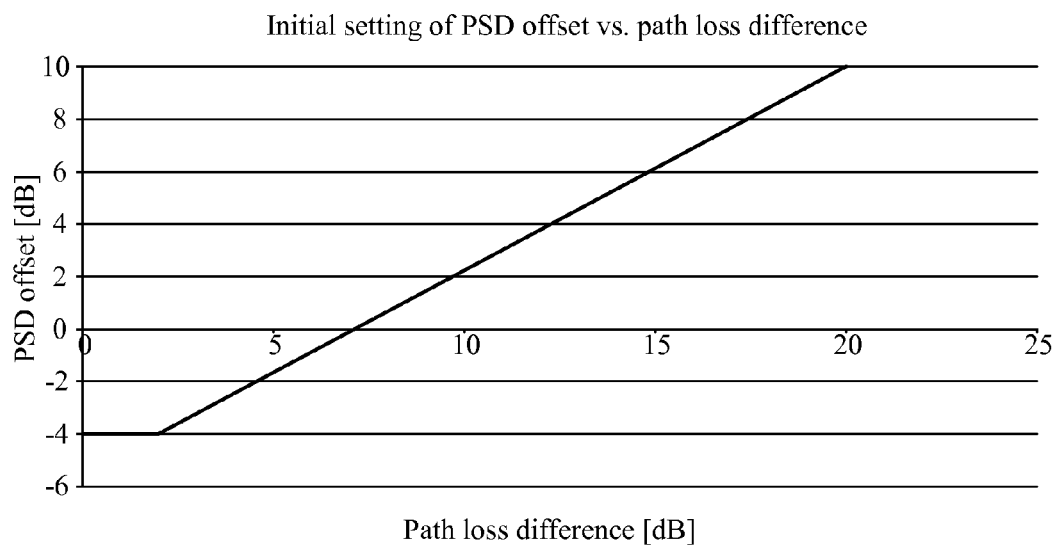
FIG. 24 presents exemplary initial open loop power control offsets implemented in accordance with various aspects.
Figure 25:
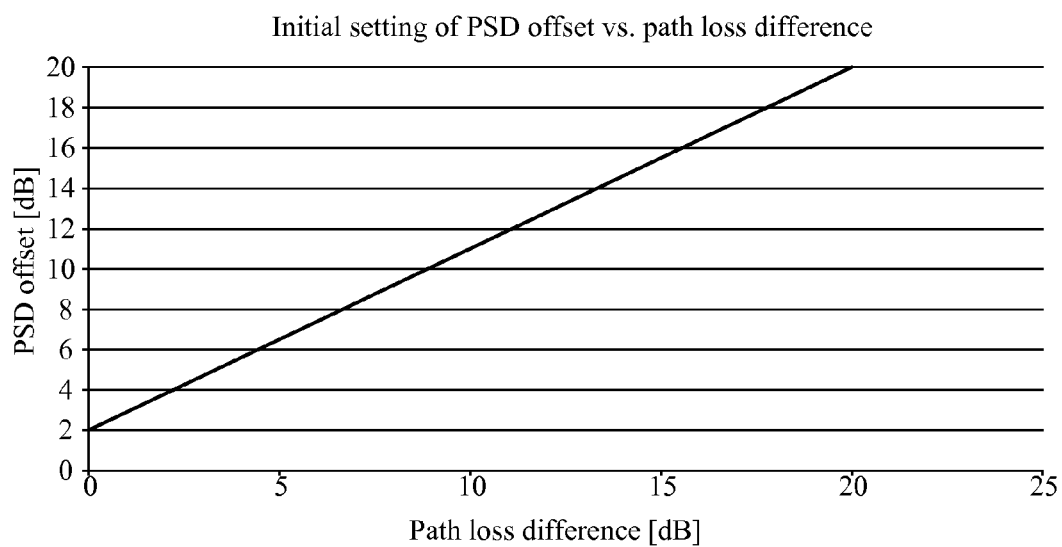
FIG. 25 presents exemplary initial open loop power control offsets implemented in accordance with various aspects.
Figure 26:
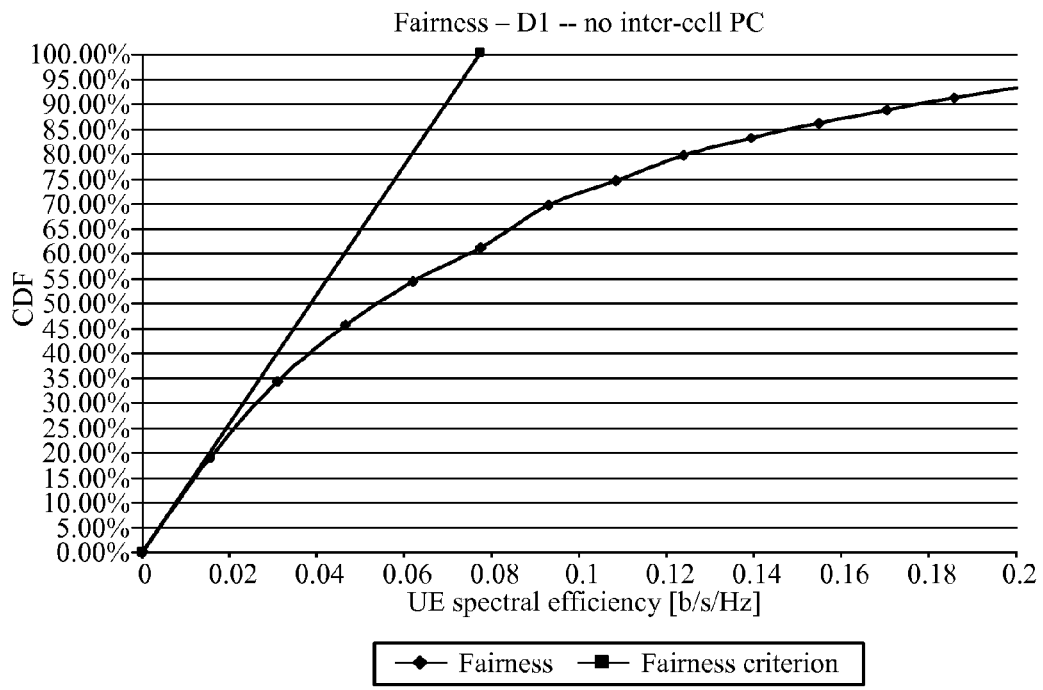
FIG. 26 presents testing results in accordance with various aspects.
Figure 27:
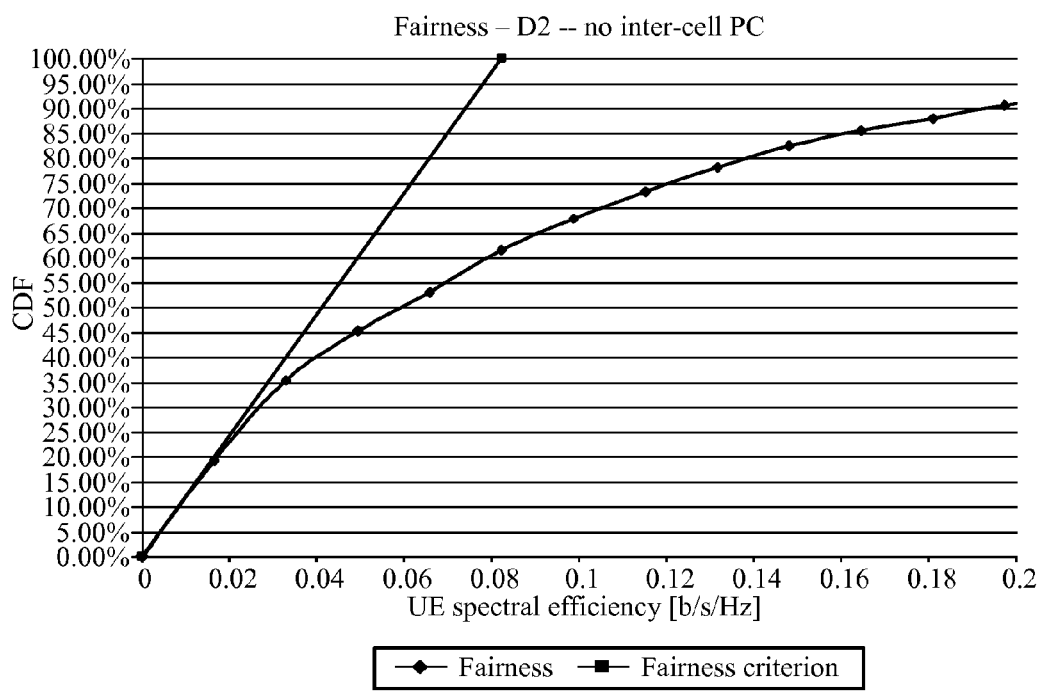
FIG. 27 presents testing results in accordance with various aspects.
Figure 28:
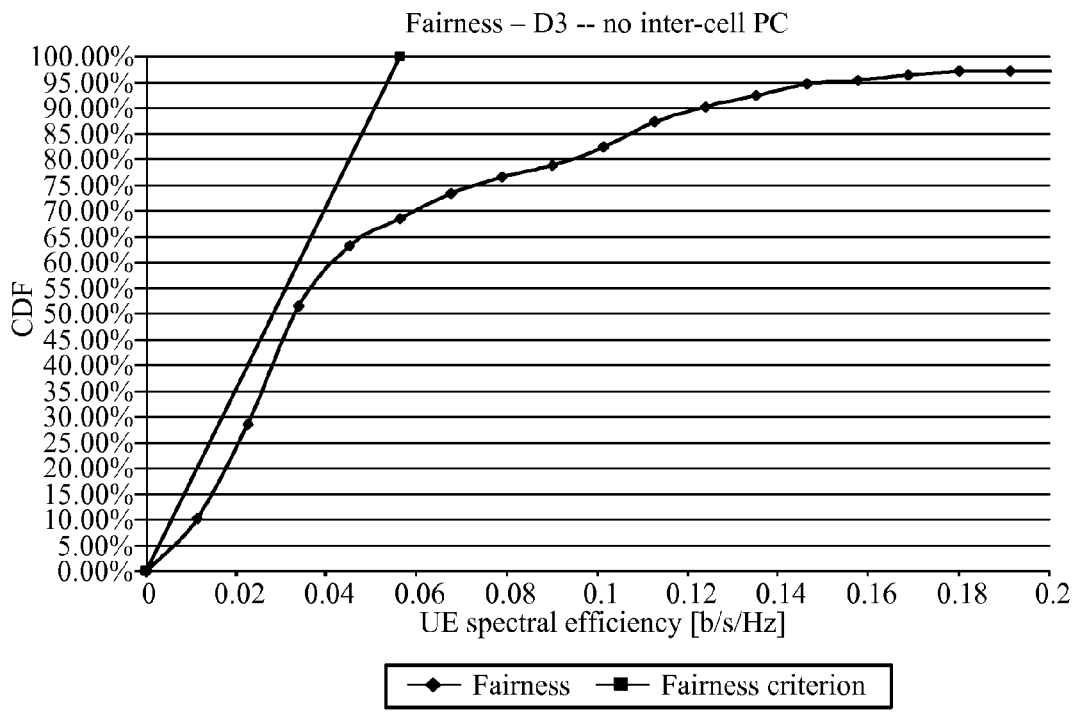
FIG. 28 presents testing results in accordance with various aspects.
Figure 29:
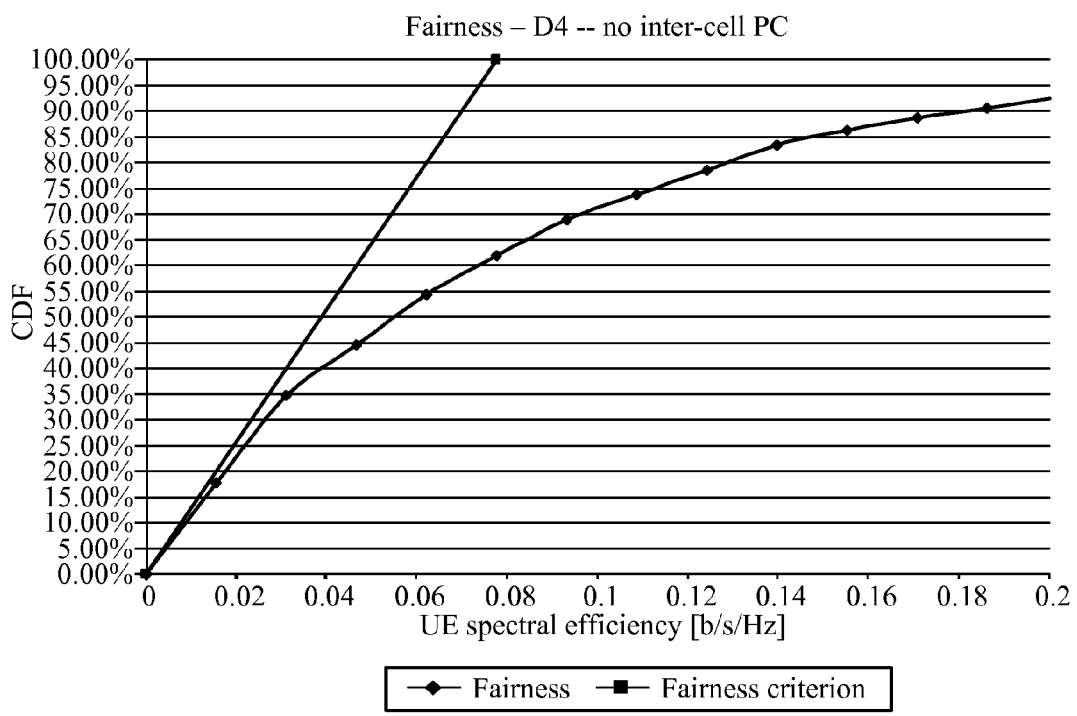
FIG. 29 presents testing results in accordance with various aspects.
Figure 30:
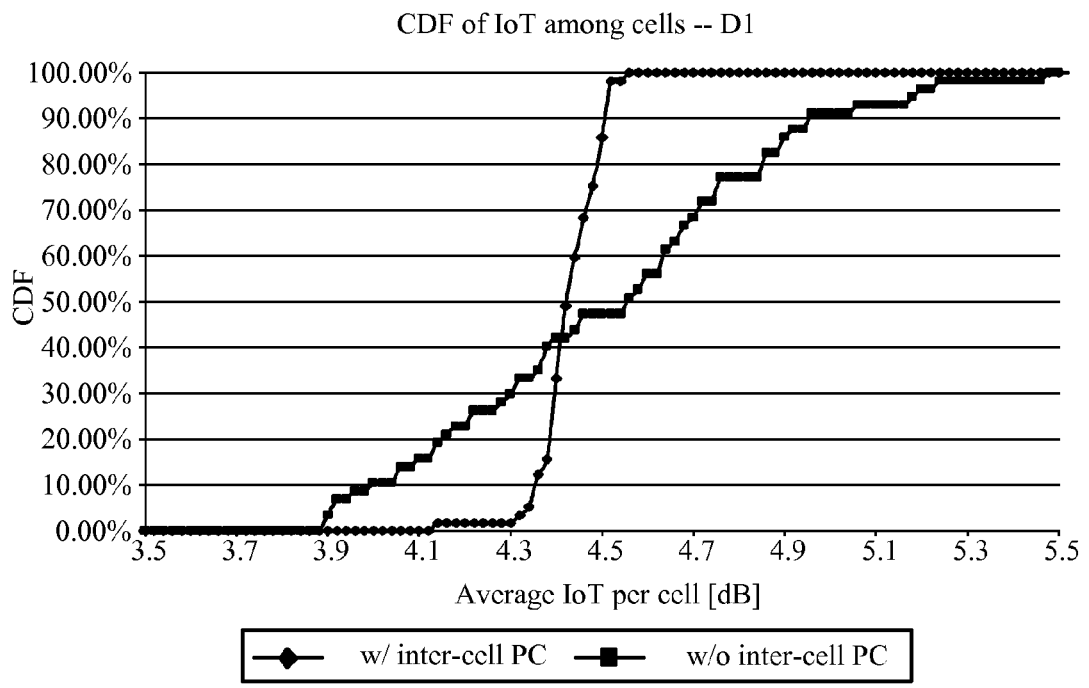
FIG. 30 presents exemplary results in accordance with various aspects set forth herein.
Figure 31:
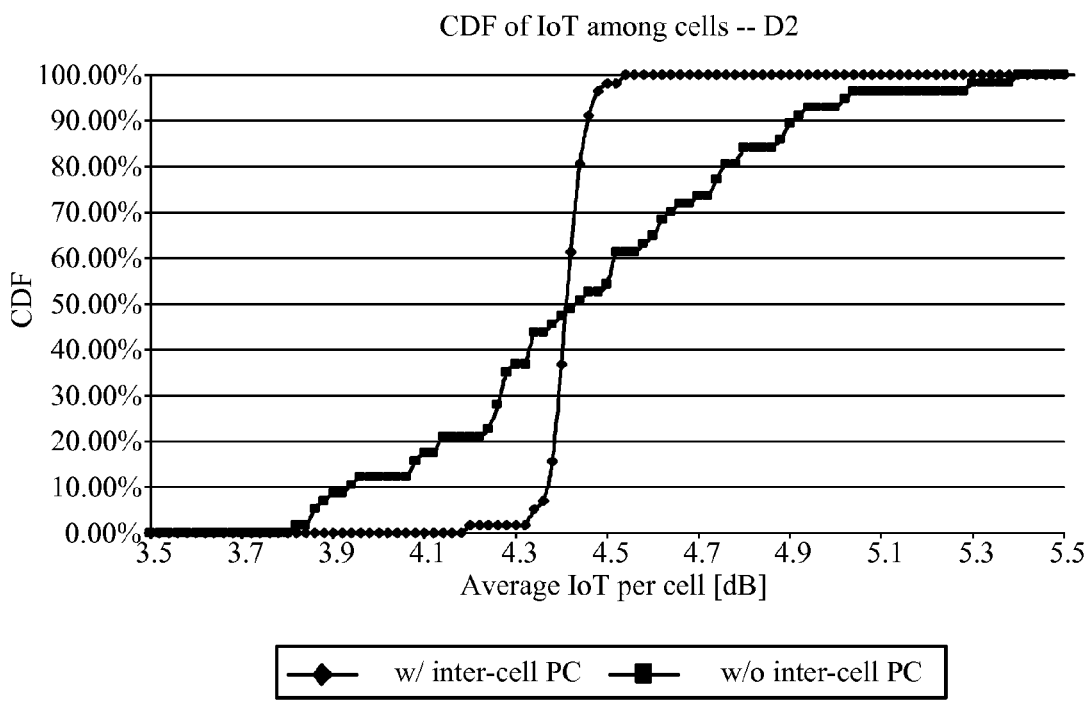
FIG. 31 presents exemplary results in accordance with various aspects.
Figure 32:
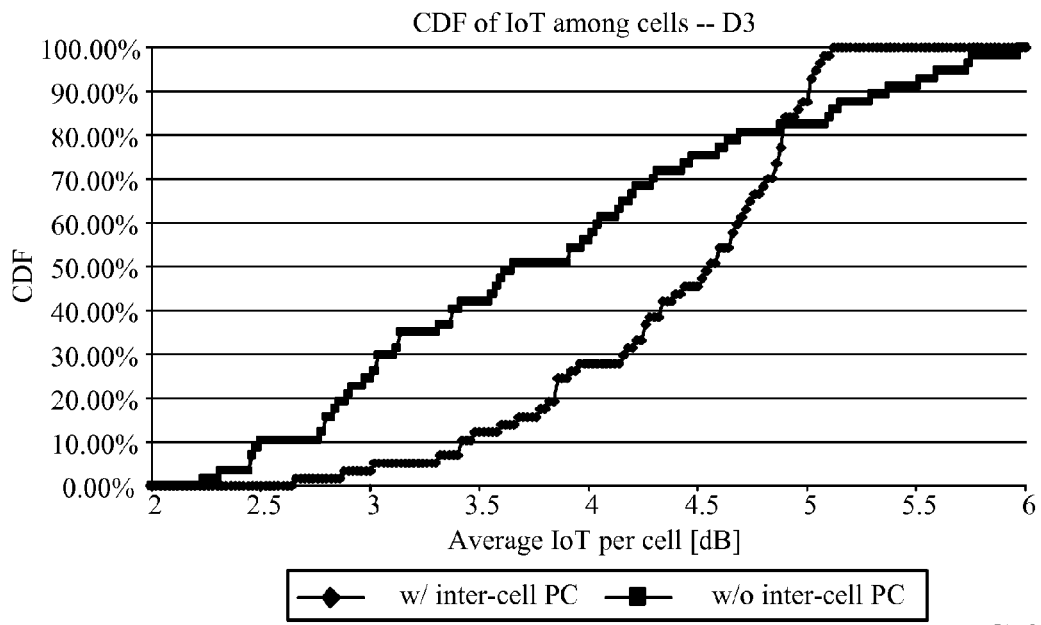
FIG. 32 presents exemplary results in accordance with various aspects.
Figure 33:
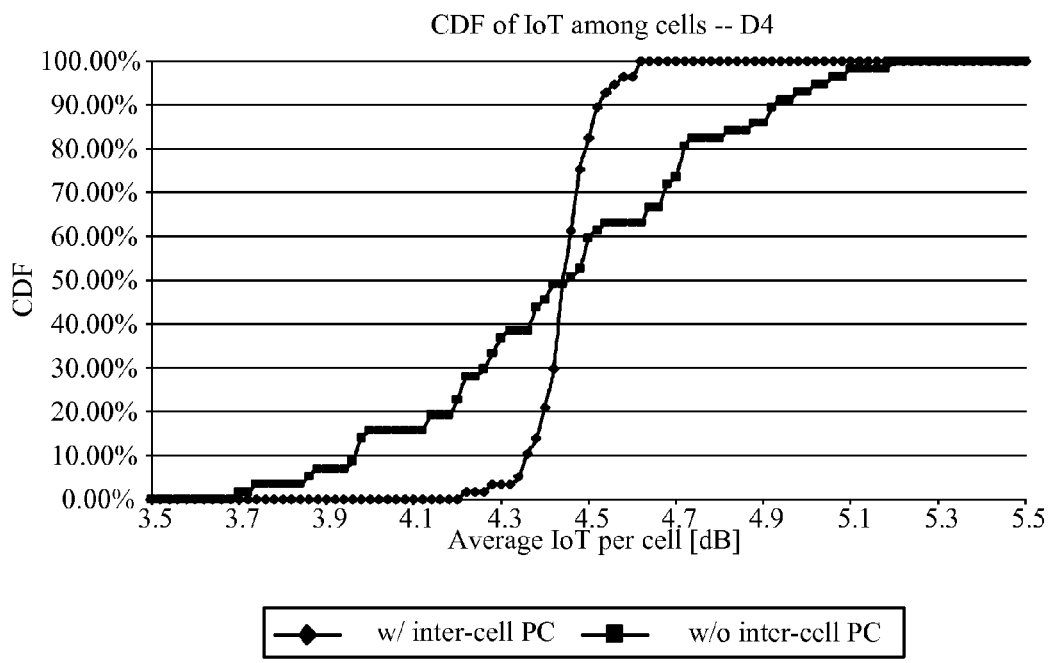
FIG. 33 presents exemplary results in accordance with various aspects.

The results in Table 4 with D1, D2 and D4 are with a different initial mapping given in FIG. 24 while D3 is with mapping in FIG. 25. FIGS. 26-29 show the different fairness curves for initial PSD setting II per Table 4. The resulting IoT for these conditions is around 4.5 dB, the fairness criterion is met and the throughput is higher. However, with D1/D2/D4 the edge spectral efficiency is much lower. Note that the results with D3 in Table 4 are slightly better than those with inter-cell power control as listed in Table 1. When there is inter-cell power control the IoT per cell is controlled fairly tightly; while there exists bigger variation in IoT in the case of no inter-cell power control. Without inter-cell power control, different cells may experience different interfering power depending on the UE layout. This can be demonstrated in FIGS. 30-33 where we show the CDF of IoT across cells with and without inter-cell power control.

The impact of inter-cell power control can be evaluated by enabling and disabling the load indicators from the neighbouring cells as summarized in Table 5.

TABLE 5

Impact of PSD Control - Capacity vs Cell Edge Performance

| Link Budget | Site-to-site Distance (m) | Speed (kph) | Closed Loop PSD Control | Mean IoT (dB) | Spectral Efficiency (b/s/Hz) | 5% Spectral Efficiency (b/s/Hz) |
|---|---|---|---|---|---|---|
| D1 | 500 | 3 | No | 4.53 | 0.77 | 0.004 |
|  |  |  | Yes | 4.43 | 0.69 | 0.017 |

Figure 34:
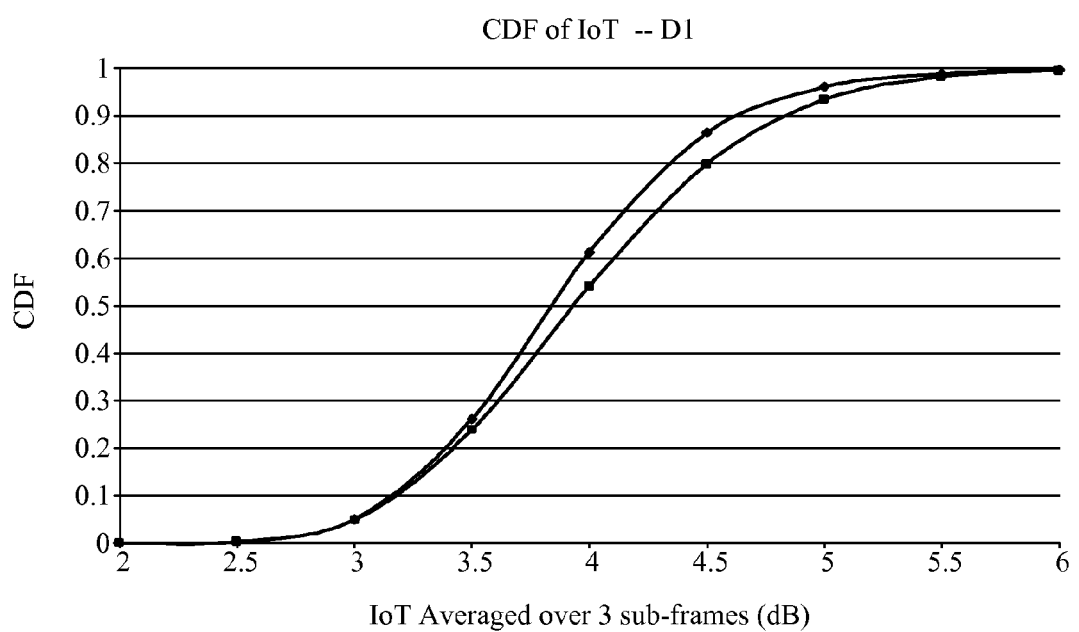
FIG. 34 presents yet more exemplary results in accordance with various aspects.

In yet another aspect, short-term IoT can be evaluated with and without inter-cell power control. In FIG. 34 we provide the CDF of short-term IoT when there is and there is not inter-cell power control. The short-term IoT is defined as the IoT averaged over 1.5 ms. It can be seen that without inter-cell power control the IoT overshoot is higher.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates inter-cell interference control in a wireless communication system, comprising:
    establishing a target received signal-to-noise ratio (SNR) based on one or more path loss readings from both an end node to a serving node and from the end node to one or more neighboring non-serving nodes;
    using an open loop power control at an onset of use of the end node or at a change in a path loss function for the end node outside of a threshold; and
    switching from the open loop power control to a closed loop power control following establishing the target received SNR and an initial pass of the open loop power control.

2. The method of claim 1, wherein the open loop power control utilizes one or more load indication commands from one or more non-serving neighbor cells.

3. The method of claim 1, wherein the closed loop power control utilizes one or more load indication commands from one or more non-serving neighbor cells.

4. The method of claim 1, wherein each of the serving node and the one or more neighboring non-serving nodes broadcasts an uplink load indicator in a downlink channel in a periodic manner or sends the load commands to one or more neighboring cells via a backhaul.

5. The method of claim 1, further comprising decoding one or more load indicator bits based on a path loss measurement from at least one dominant interfering cell or listening to one or more load commands sent from the serving node in a scheduling or explicit message.

6. The method of claim 5, further comprising causing the end node to reduce transmit power spectral density (PSD) based on the one or more load indicator bits or the one or more load commands.

7. The method of claim 1, further comprising maintaining a reference PSD, and using the reference power spectral density (PSD) for intra-cell power control.

8. The method of claim 7, further comprising receiving a PSD delta value and supportable bandwidth data from the end node.

9. The method of claim 8, further comprising granting an uplink assignment to the end node comprising bandwidth information or a packet format based in part on the PSD delta value and the supportable bandwidth data.

10. The method of claim 1, further comprising assigning bandwidth to one or more UEs based on the following equation:

$$W_{assign}(i) = \text{Assigned bandwidth for UE } i \leq W_{tx}(i)$$

and each of the one or more UEs sets its transmit power spectral density (PSD) to $\Phi_{tx}(i)$ and transmits data at the power level given by:

$$P_{assigned}(i) = \Phi_{tx}(i) \cdot W_{assign}(i) \leq P_{max}(i)$$

wherein
$\Phi_{ref}(i)$=Reference PSD for UE i
$W_{ref}$=Reference bandwidth
$\Phi_{tx}(i)$=Tx PSD for UE i
$\Delta_{psd}$=Reference PSD boost (dB)
$W_{tx}(i)$=Supportable bandwidth for UE i
The reference PSD is defined as:

$$\Phi_{ref}(i) = \frac{P_{ref}(i)}{W_{ref}}$$

The UE periodically reports:

$$\Delta(i) = \Delta_{psd} - f(L_i)$$

$$W_{tx}(i) = \frac{P_{max}(i)}{\Phi_{tx}(i)}$$

wherein the Tx PSD is defined as:

$$\Phi_{tx}(i) = \frac{P_{ref}(i)}{W_{ref}} \cdot 10^{\Delta(i)/10}$$

and $L_i$ represents the load indicator at the UE i.

11. A non-transitory computer readable medium having stored thereon computer executable instructions for performing the following acts:
    establishing a target received signal-to-noise ratio (SNR) based on one or more path loss readings from both an end node to a serving node and from the end node to one or more neighboring non-serving nodes;
    using an open loop power control at an onset of use of the end node or at a change in a path loss function for the end node outside of a threshold; and
    switching from the open loop power control to a closed loop power control following establishing the target received SNR and an initial pass of the open loop power control.

12. The computer readable medium of claim 11, further having stored thereon computer executable instructions for: broadcasting an uplink load indicator in a downlink channel in a periodic manner or sending one or more load commands to one or more neighboring cells via a backhaul.

13. The computer readable medium of claim 11, further having stored thereon computer executable instructions for decoding one or more load indicator bits from at least one dominant interfering cell or from the serving node based on a path loss measurement.

14. The computer readable medium of claim 13, further having stored thereon computer executable instructions for causing the end node to reduce transmit power spectral density (PSD) based on the one or more load indicator bits.

15. The computer readable medium of claim 11, further having stored thereon computer executable instructions for maintaining a reference power spectral density (PSD), and using the reference PSD for intra-cell power control.

16. The computer readable medium of claim 15, further having stored thereon computer executable instructions for receiving a PSD delta value and supportable bandwidth data from the end node.

17. The computer readable medium of claim 16, further having stored thereon computer executable instructions for granting an uplink assignment to the end node comprising bandwidth information or a packet format based in part on the PSD delta value and the supportable bandwidth data.

18. The computer readable medium of claim 11, further having stored thereon computer executable instructions for assigning bandwidth to one or more UEs based on the following equation:

$$W_{assign}(i) = \text{Assigned bandwidth for UE } i \leq W_{tx}(i)$$

and each of the one or more UEs sets its transmit power spectral density (PSD) to $\Phi_{tx}(i)$ and transmits data at the power level given by:

$$P_{assigned}(i) = \Phi_{tx}(i) \cdot W_{assign}(i) \leq P_{max}(i)$$

wherein
$\Phi_{ref}(i)$=Reference PSD for UE i
$W_{ref}$=Reference bandwidth
$\Phi_{tx}(i)$=Tx PSD for UE i
$\Delta_{psd}$=Reference PSD boost (dB)
$W_{tx}(i)$=Supportable bandwidth for UE i
The reference PSD is defined as:

$$\Phi_{ref}(i) = \frac{P_{ref}(i)}{W_{ref}}$$

The UE periodically reports:

$$\Delta(i) = \Delta_{psd} - f(L_i)$$

$$W_{tx}(i) = \frac{P_{max}(i)}{\Phi_{tx}(i)}$$

wherein the Tx PSD is defined as:

$$\Phi_{tx}(i) = \frac{P_{ref}(i)}{W_{ref}} \cdot 10^{\Delta(i)/10}$$

and $L_i$ represents the load indicator at the UE i.

19. A processor for controlling inter-cell interference in a wireless communication system that executes computer executable code stored on a storage medium to:
  establish a target received signal-to-noise ratio (SNR) based on one or more path loss readings from both an end node to a serving node and from the end node to one or more neighboring non-serving nodes;
  use an open loop power control at an onset of use of the end node or at a change in a path loss function for the end node outside of a threshold; and
  switch from the open loop power control to a closed loop power control following establishing the target received SNR and an initial pass of the open loop power control.

20. The processor of claim 19, further executing computer executable instructions for broadcasting an uplink load indicator in a downlink channel in a periodic manner or sending one or more load commands to one or more neighboring cells via a backhaul.

21. The processor of claim 19, further executing computer executable instructions for decoding one or more load indicator bits based on a path loss measurement from at least one dominant interfering cell or from the serving node.

22. The processor of claim 21, further executing computer executable instructions for causing the end node to reduce transmit power spectral density (PSD) based on the one or more load indicator bits.

23. The processor of claim 19, further executing computer executable instructions for maintaining a reference power spectral density (PSD), and using the reference PSD for intra-cell power control.

24. The processor of claim 23, further executing computer executable instructions for receiving a PSD delta value and supportable bandwidth data from the end node.

25. The processor of claim 24, further executing computer executable instructions for granting an uplink assignment to the end node comprising bandwidth information or a packet format based in part on the PSD delta value and the supportable bandwidth.

26. The processor of claim 19, further executing computer executable instructions for assigning bandwidth to one or more UEs based on the following equation:

$$W_{assign}(i) = \text{Assigned bandwidth for UE } i \leq W_{tx}(i)$$

and each of the one or more UEs sets its transmit power spectral density (PSD) to $\Phi_{tx}(i)$ and transmits data at the power level given by:

$$P_{assigned}(i) = \Phi_{tx}(i) \cdot W_{assign}(i) \leq P_{max}(i)$$

wherein
  $\Phi_{ref}(i)$=Reference PSD for UE i
  $W_{ref}$=Reference bandwidth
  $\Phi_{tx}(i)$=Tx PSD for UE i
  $\Delta_{psd}$=Reference PSD boost (dB)
  $W_{tx}(i)$=Supportable bandwidth for UE i The reference PSD is defined as:

$$\Phi_{ref}(i) = \frac{P_{ref}(i)}{W_{ref}}$$

The UE periodically reports:

$$\Delta(i) = \Delta_{psd} - f(L_i)$$

$$W_{tx}(i) = \frac{P_{max}(i)}{\Phi_{tx}(i)}$$

wherein the Tx PSD is defined as:

$$\Phi_{tx}(i) = \frac{P_{ref}(i)}{W_{ref}} \cdot 10^{\Delta(i)/10}$$

and $L_i$ represents the load indicator at the UE i.

27. A system that that facilitates inter-cell interference control in a wireless communication system, comprising
  means for establishing a target received signal-to-noise ratio (SNR) based on one or more path loss readings from both an end node to a serving node and from the end node to one or more neighboring non-serving nodes;
  means for using an open loop power control at an onset of use of the end node or at a change in a path loss function for the end node outside of a threshold; and
  means for switching from the open loop power control to a closed loop power control following establishing the target received SNR and an initial pass of the open loop power control.

28. The system of claim 27, further comprising means for broadcasting an uplink load indicator in a downlink channel in a periodic manner or sending one or more load commands to one or more neighboring cells via a backhaul.

29. The system of claim 27, further comprising means for decoding one or more load indicator bits based on a path loss measurement from at least one dominant interfering cell or from the serving node.

30. The system of claim 29, further comprising means for causing the end node to reduce transmit power spectral density (PSD) based on the one or more load indicator bits.

31. The system of claim 27, further comprising means for maintaining a reference power spectral density (PSD), and using the reference PSD for intra-cell power control.

32. The system of claim 31, further comprising means for g receiving a PSD delta value and supportable bandwidth data from the end node.

33. The system of claim 32, further comprising means for granting an uplink assignment to the end node comprising bandwidth information or a packet format based in part on the PSD delta value and the supportable bandwidth.

34. The system of claim 27, further comprising means for assigning bandwidth to one or more UEs based on the following equation:

$$W_{assign}(i) = \text{Assigned bandwidth for UE } i \leq W_{tx}(i)$$

and each of the one or more UEs sets its transmit power spectral density (PSD) to $\Phi_{tx}(i)$ and transmits data at the power level given by:

$$P_{assigned}(i) = \phi_{tx}(i) \cdot W_{assign}(i) \leq P_{max}(i)$$

wherein
$\phi_{ref}(i)$=Reference PSD for UE i
$W_{ref}$=Reference bandwidth
$\phi_{tx}(i)$=Tx PSD for UE i
$\Delta_{psd}$=Reference PSD boost (dB)
$W_{tx}(i)$=Supportable bandwidth for UE i
The reference PSD is defined as:

$$\Phi_{ref}(i) = \frac{P_{ref}(i)}{W_{ref}}$$

The UE periodically reports:

$$\Delta(i) = \Delta_{psd} - f(L_i)$$

$$W_{tx}(i) = \frac{P_{max}(i)}{\Phi_{tx}(i)}$$

wherein the Tx PSD is defined as:

$$\Phi_{tx}(i) = \frac{P_{ref}(i)}{W_{ref}} \cdot 10^{\Delta(i)/10}$$

and $L_i$ represents the load indicator at the UE i.

* * * * *